United States Patent
Sheehy et al.

(10) Patent No.: US 10,497,065 B1
(45) Date of Patent: Dec. 3, 2019

(54) AUTOMATICALLY CORRECTING RECORDS

(71) Applicant: Ab Initio Technology LLC, Lexington, MA (US)

(72) Inventors: Ed Sheehy, New York, NY (US); Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 660 days.

(21) Appl. No.: 14/798,188

(22) Filed: Jul. 13, 2015

Related U.S. Application Data

(60) Provisional application No. 62/081,674, filed on Nov. 19, 2014.

(51) Int. Cl.
*G06Q 40/00* (2012.01)

(52) U.S. Cl.
CPC ............. *G06Q 40/12* (2013.12); *G06Q 40/10* (2013.01)

(58) Field of Classification Search
CPC ............................... G06Q 40/12; G06Q 40/10
USPC ........................................................... 705/30
See application file for complete search history.

(56) References Cited

U.S. PATENT DOCUMENTS

| | | | | |
|---|---|---|---|---|
| 8,170,932 B1 * | 5/2012 | Krakowiecki | ......... | G06Q 40/12 705/30 |
| 8,620,895 B1 * | 12/2013 | Lish | ....................... | G06Q 40/12 707/706 |
| 8,626,769 B1 * | 1/2014 | Bhatt | ..................... | G06Q 40/12 707/740 |
| 2004/0059651 A1 * | 3/2004 | MaGuire, III | ......... | G06Q 40/02 705/30 |
| 2006/0235774 A1 * | 10/2006 | Campbell | .............. | G06Q 40/08 705/30 |
| 2007/0192222 A1 * | 8/2007 | Mika | ..................... | G06Q 20/10 705/35 |
| 2008/0162515 A1 * | 7/2008 | Dovas | .................. | G06Q 10/063 |

\* cited by examiner

*Primary Examiner* — Florian M Zeender
*Assistant Examiner* — Christopher R Buchanan
(74) *Attorney, Agent, or Firm* — Fish & Richardson P.C.

(57) ABSTRACT

A computer-implemented method including: receiving data representing updates to transaction entries in a ledger of an accounting system, each transaction entry identifying an account that corresponds to the transaction, at least some of the updates a) each changing the identified account from a first account to a second account and b) having been submitted by multiple users of the accounting system; analyzing the updates to infer a correlation between the first account and the second account; generating a rule defining a modification of transaction entries, wherein the rule, if applied to transaction entries received by the accounting system, would modify transaction entries identifying the first account to identify the second account; and storing the rule in a storage system such that the stored rule can be accessed and executed by a computer program executing on one or more computer systems, the execution of the rule causing the modification of the transaction entries defined by the rule.

27 Claims, 26 Drawing Sheets

Figure 3:
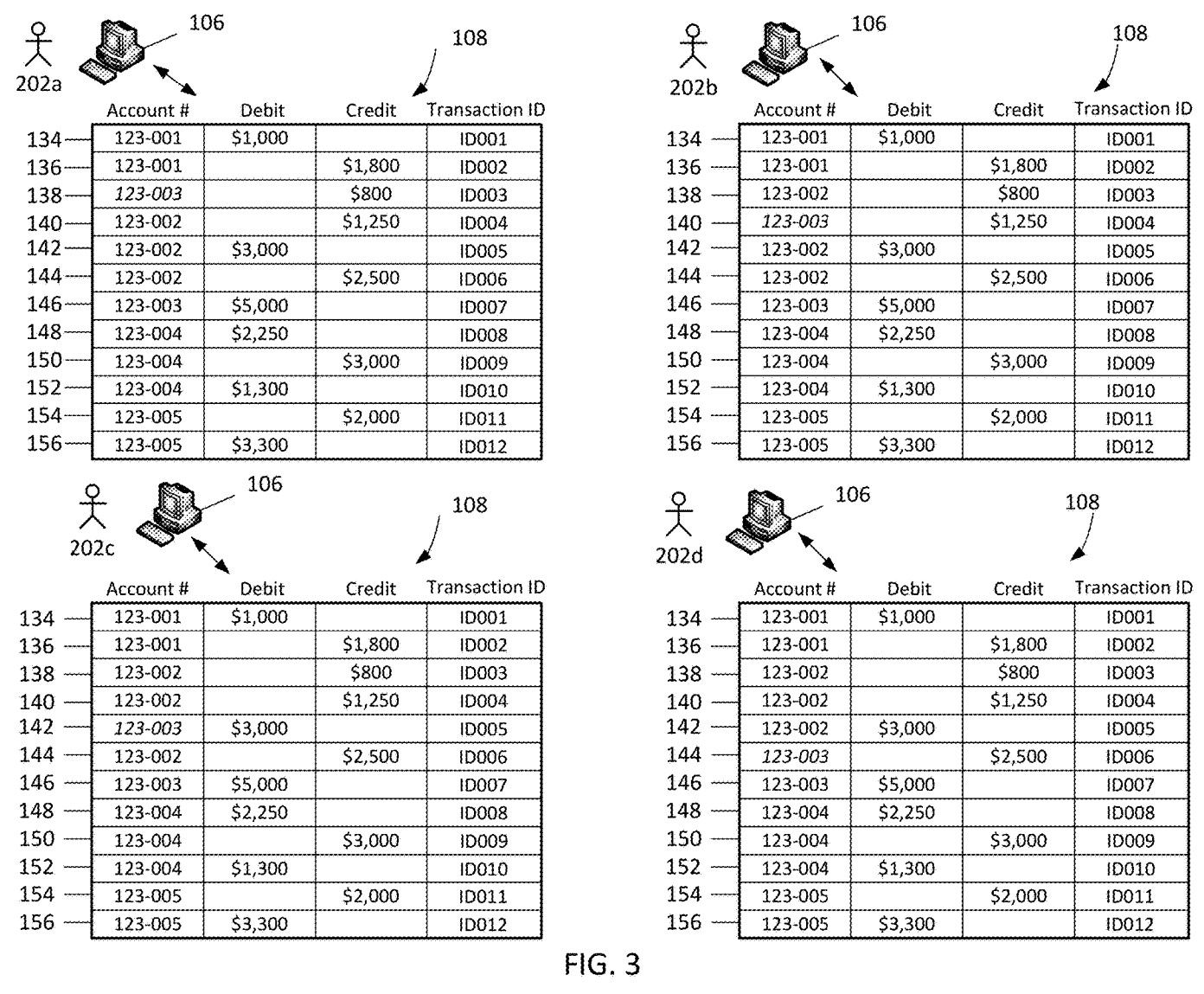

| Account # | Debit | Credit | Transaction ID |
|---|---|---|---|
| 123-001 | $1,000 | | ID001 |
| 123-001 | | $1,800 | ID002 |
| 123-002 | | $800 | ID003 |
| 123-003 | $3,000 | $1,250 | ID004 |
| 123-002 | | $2,500 | ID005 |
| 123-002 | $5,000 | | ID006 |
| 123-003 | $2,250 | | ID007 |
| 123-004 | | $3,000 | ID008 |
| 123-004 | $1,300 | | ID009 |
| 123-004 | | $2,000 | ID010 |
| 123-005 | | | ID011 |
| 123-005 | $3,300 | | ID012 |

Companion Report

- Account 123-002 is changed to Account 123-003 50% of the time
- Labor cost of manual updates estimated to be $750
- Example changes if rule approved:

| Account # | Debit | Credit |
|---|---|---|
| ~~123-002~~ 123-003 | $2,300 | |
| ~~123-002~~ 123-003 | | $12,500 |

- Materiality of the changes to the ledger over time: the changes affect approximately $100,000 of debits and credits

FIG. 7

| Account # | Debit | Credit | Transaction ID |
|---|---|---|---|
| 123-001 | $1,000 | | ID001 |
| 123-001 | | $1,800 | ID002 |
| 123-002 | | $800 | ID003 |
| 123-002 | | $1,250 | ID004 |
| 123-002 | $3000 | | ID005 |
| 123-002 | | $2,500 | ID006 |
| 123-003 | $5,000 | | ID007 |
| 123-004 | $2,250 | | ID008 |
| 123-004 | | $3,000 | ID009 |
| 123-004 | $1,300 | | ID010 |
| 123-005 | | $2,000 | ID011 |
| 123-005 | $3,300 | | ID012 |

108

| Account # | New Account # |
|---|---|
| 123-002 | 123-003 |
| 123-002 | 123-003 |
| 123-002 | 123-003 |
| 123-002 | 123-003 |

| Original Account # | Debit | Credit | Transaction ID | New Account # |
|---|---|---|---|---|
| 123-001 | $1,000 | | ID001 | |
| 123-001 | | $1,800 | ID002 | |
| 123-002 | | $800 | ID003 | 123-003 |
| 123-002 | $3000 | $1,250 | ID004 | 123-003 |
| 123-002 | | $2,500 | ID005 | 123-003 |
| 123-003 | $5,000 | | ID006 | 123-003 |
| 123-004 | $2,250 | | ID007 | |
| 123-004 | | $3,000 | ID008 | |
| 123-004 | $1,300 | | ID009 | |
| 123-005 | | $2,000 | ID010 | |
| 123-005 | | | ID011 | |
| 123-005 | $3,300 | | ID012 | |

| Orig Account # | Debit | Credit | Transaction ID | New Account # |
|---|---|---|---|---|
| 123-001 | $1,000 | | ID001 | |
| 123-001 | | $1,800 | ID002 | |
| 123-002 | | $800 | ID003 | 123-003 |
| 123-002 | $3000 | $1,250 | ID004 | 123-003 |
| 123-002 | | $2,500 | ID005 | 123-003 |
| 123-003 | $5,000 | | ID006 | |
| 123-004 | $2,250 | | ID007 | |
| 123-004 | | $3,000 | ID008 | |
| 123-004 | $1,300 | | ID009 | |
| 123-005 | | $2,000 | ID010 | |
| 123-005 | | | ID011 | |
| 123-005 | $3,300 | | ID012 | |

| Original Account # | New Account # | Count |
|---|---|---|
| 123-001 | | 2 |
| 123-002 | 123-003 | 3 |
| 123-002 | | 1 |
| 123-003 | | 1 |
| 123-004 | | 3 |
| 123-005 | | 2 |

1410

| Original Account # | New Account # | Count |
|---|---|---|
| 123-002 | 123-003 | 3 |
| 123-002 | | 1 |

| Original Account # | Amount | Transaction ID | New Account # |
|---|---|---|---|
| 333-001 | $1,000 | ID101 | |
| 333-002 | $1,000 | ID102 | 333-100 |
| 333-002 | $2,500 | ID103 | 333-100 |
| 333-002 | $3,000 | ID104 | 333-100 |
| 333-002 | $500 | ID105 | |
| 333-003 | $500 | ID106 | |
| 333-003 | $1,000 | ID107 | 333-110 |
| 333-003 | $1,500 | ID108 | 333-110 |
| 333-003 | $2,000 | ID109 | 333-110 |
| 333-003 | $2,500 | ID110 | 333-110 |
| 333-004 | $1,000 | ID111 | |
| 333-004 | $1,000 | ID112 | |

| Original Account # | Amount >= $1,000 | Transaction ID | New Account # |
|---|---|---|---|
| 333-001 | YES | ID101 | |
| 333-002 | YES | ID102 | 333-100 |
| 333-002 | YES | ID103 | 333-100 |
| 333-002 | YES | ID104 | 333-100 |
| 333-002 | No | ID105 | |
| 333-003 | No | ID106 | |
| 333-003 | YES | ID107 | 333-110 |
| 333-003 | YES | ID108 | 333-110 |
| 333-003 | YES | ID109 | 333-110 |
| 333-003 | YES | ID110 | 333-110 |
| 333-004 | YES | ID111 | |
| 333-004 | YES | ID112 | |

1416

| Original Account # | Amount >= $1,000 | New Account # | Count |
|---|---|---|---|
| 333-001 | YES | | 1 |
| 333-002 | YES | 333-100 | 3 |
| 333-002 | No | | 1 |
| 333-003 | No | | 1 |
| 333-003 | YES | 333-110 | 4 |
| 333-004 | YES | | 2 |

| Account # | Old Count | New Count |
|---|---|---|
| 123-001 | 2 | 2 |
| 123-002 | 4 | 0 |
| 123-003 | 1 | 5 |
| 123-004 | 3 | 3 |
| 123-005 | 2 | 2 |

| Account # | Old Count | New Count |
|---|---|---|
| 123-002 | 4 | 0 |
| 123-003 | 1 | 5 |

| Original Account # | Debit | Credit | Transaction ID | New Account # |
|---|---|---|---|---|
| 123-002 | | $800 | ID003 | 123-003 |
| 123-002 | | $1,250 | ID004 | 123-003 |
| 123-002 | $3000 | | ID005 | 123-003 |
| 123-002 | | $2,500 | ID006 | 123-003 |

FIG. 15d

AUTOMATICALLY CORRECTING RECORDS

CLAIM OF PRIORITY

This application claims priority to U.S. Provisional Patent Application Ser. No. 62/081,674, filed on Nov. 19, 2014, the entire contents of which are hereby incorporated by reference.

BACKGROUND

This description relates to automatically correcting records.

A general ledger of an accounting system can contain incorrect information. Correcting such incorrect information can be time-consuming.

SUMMARY

In one aspect, a computer-implemented method includes receiving data representing updates to transaction entries in a ledger of an accounting system. Each transaction entry identifies an account that corresponds to the transaction. At least some of the updates a) each change the identified account from a first account to a second account and b) has been submitted by multiple users of the accounting system. The method also includes analyzing the updates to infer a correlation between the first account and the second account. The method also includes generating a rule defining a modification of transaction entries. The rule, if applied to transaction entries received by the accounting system, would modify transaction entries identifying the first account to identify the second account. The method also includes storing the rule in a storage system such that the stored rule can be accessed and executed by a computer program executing on one or more computer systems. The execution of the rule causes the modification of the transaction entries defined by the rule.

Implementations can include one or more of the following features.

In some implementations, the method also includes providing the generated rule for approval to an entity authorized to modify transaction entries received by the accounting system.

In some implementations, the entity authorized to modify transaction entries received by the accounting system includes a manager of the multiple users of the accounting system.

In some implementations, the analysis of the updates includes a determination of a percentage of the transaction entries that identified the first account that were changed to identify the second account.

In some implementations, the method also includes providing, to the entity, a companion report that includes information related to the generated rule.

In some implementations, the companion report describes one or more of i) a percentage of times the account identification was updated by the multiple users, ii) an estimate of labor cost of the manual updates, iii) example changes to the ledger if the rule were approved, and iv) materiality of the changes to the ledger over a time period.

In some implementations, the method also includes updating, in a test environment, a first instance of the ledger based on the rule, in parallel with a second instance of the ledger that is not updated based on the rule.

In some implementations, the correlation is identified based on a census technique.

In some implementations, the correlation is identified based on a functional dependency technique.

In another aspect, a system includes a recordkeeping system configured to receive, from multiple users, manual updates to values of records stored by the recordkeeping system. The system also includes an analysis engine configured to identify one or more patterns among the updates received from the multiple users. The system also includes a rules generation engine configured to generate one or more rules based on the one or more patterns identified by the analysis engine. The system also includes a rules interface configured to provide, to a recordkeeping manager, the one or more rules generated by the rules generation engine.

Implementations can include one or more of the following features.

In some implementations, the rules interface is configured to receive, from the recordkeeping manager, approval for one or more of the rules.

In some implementations, the recordkeeping system is an accounting system.

In some implementations, the records are stored in a general ledger of the accounting system.

In some implementations, the updates to values of records include changing an account identified in at least some of the records from a first account to a second account.

In some implementations, the one or more of the patterns includes a correlation between the first account and the second account.

In some implementations, the recordkeeping system is a securities trading system operated by a securities brokerage. The records include securities trade instructions.

In some implementations, the updates to values of the records include changing an error in at least some of the securities trade instructions.

In some implementations, the updates to values of the records are received from a system of a middle office of the securities brokerage.

In some implementations, the recordkeeping system is operated by a freight forwarder. The records include shipment instructions.

In some implementations, the updates to values of records include changing an error in at least some of the shipment instructions.

In some implementations, the recordkeeping system is operated by an entity that manages pharmaceutical benefits. The records include requests to approve a pharmaceutical purchase by the entity that manages pharmaceutical benefits. A request is processed by the entity to determine one or more of i) whether a customer associated with the request is eligible for a particular health coverage, ii) whether the pharmaceutical is on a formulary for a health plan associated with the customer, iii) whether a generic pharmaceutical can be substituted for the pharmaceutical, and iv) a co-pay amount to be collected as part of the purchase.

In some implementations, the updates to values of the records include manual corrections to at least some of the requests which could not be approved automatically.

In some implementations, the patterns are identified based on a census technique.

In some implementations, the patterns are identified based on a functional dependency technique.

In another aspect, a non-transitory computer readable storage device stores a computer program product including executable code that, when executed, would cause a computer system to carry out operations including receiving data representing updates to transaction entries in a ledger of an accounting system. Each transaction entry identifies an account that corresponds to the transaction. At least some of the updates a) each changes the identified account from a first account to a second account and b) has been submitted by multiple users of the accounting system. The operations also include analyzing the updates to infer a correlation between the first account and the second account. The operations also include generating a rule defining a modification of transaction entries. The rule, if applied to transaction entries received by the accounting system, would modify transaction entries identifying the first account to identify the HI second account. The operations also include storing the rule in a storage system such that the stored rule can be accessed and executed by a computer program executing on one or more computer systems. The execution of the rule causes the modification of the transaction entries defined by the rule.

Aspects can include one or more of the following advantages.

A recordkeeping system that includes rules for modifying automatically-generated transactions or electronically submitted entries can help keep records up to date without sacrificing resources, such as man-hours and/or labor costs. The creation of the rules requires minimal resources because the rules are generated (e.g., by a rules generation engine) rather than created manually. Furthermore, the generated rules ensure consistency of treatment, whereas manually corrected entries are subject to variable execution. Any risk of implementing such generated rules that will have an unintended impact on the recordkeeping system can be mitigated by enabling a person having decision-making authority to accept or reject the rule based on known information.

Other features and advantages of the invention will become apparent from the following description, and from the claims.

DESCRIPTION OF DRAWINGS

FIG. 3 shows examples of updates made to transaction entries of the accounting system of FIG. 1.
FIG. 7 shows an example of a companion report.
FIGS. 14a-f show examples of accounting system data.
FIGS. 15a-f show examples of accounting system data.

DESCRIPTION

A general ledger is at the core of many accounting systems. In many large businesses, the general ledger contains debit and credit postings automatically generated or electronically submitted by different systems across the firm. These postings sometimes contain incorrect information. In such cases, the submitted entry is reversed and a correcting entry will be manually generated by some member of the accounting staff. For example, a record may indicate that a credit is applied to an account that has already been closed, and an accountant would then manually update the record to reflect an active account. (A change of account in this manner is sometimes called reclassification).

Manual correction of debit and credit postings and other records in a general ledger can be time-consuming, and so automation can save time and labor. In a large enough accounting system, dozens, hundreds, or thousands of accountants may be updating the ledger, many of whom may be making the same type of change to different records, e.g., changing the same closed account to the same active account in different records in which the closed account appears. In order to automate this process, a correction system can identify patterns in manual corrections in the accounting system. The correction system can then develop proposed automated rules that would apply to future debit and credit postings that fit the same respective patterns. The proposed automated rule can be presented to an accounting manager (for example, one who oversees all of the accountants) for approval or rejection, e.g., once the accounting manager reviews the potential impact of the proposed rule.

Figure 1:
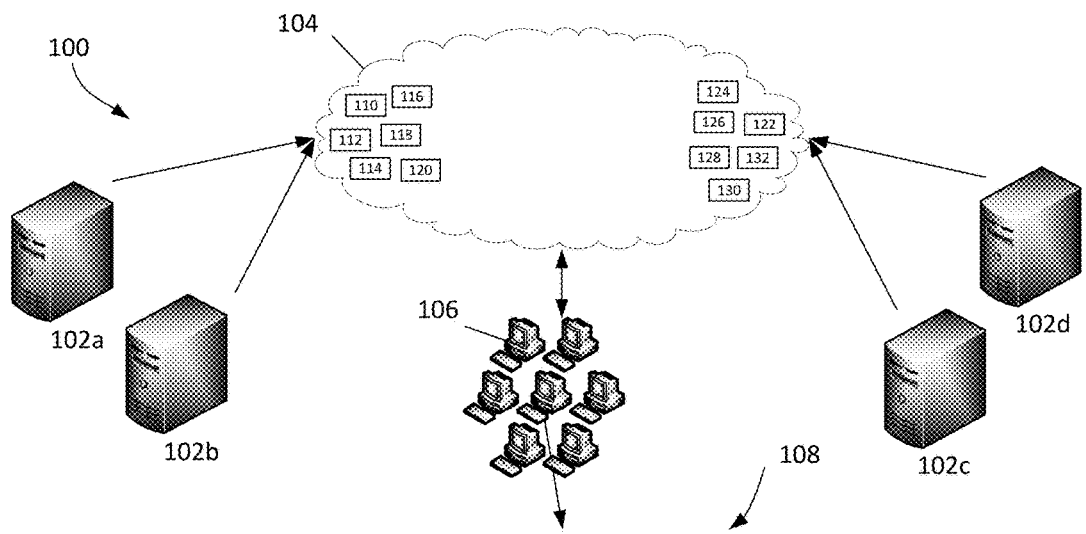
FIG. 1 is a block diagram of an accounting system.

FIG. 1 shows an example of a recordkeeping system, e.g., an accounting system 100, for managing transactions (e.g., transactions 110-132) to accounts of the accounting system 100. The transactions 110-132 can include credit and debit postings associated with accounts. For example, a transaction may indicate that $750 dollars has been credited to Account 123-008. Each of the transactions 110-132 is associated with a transaction ID (e.g., ID001-ID012). The accounting system 100 includes one or more systems 102a-d (e.g., computer systems) that can automatically generate and/or electronically submit the transactions 110-132 in response to receiving information related to the transactions 110-132 from another source. The transactions 110-132 can be generated based on the received information and the transactions 110-132 can include the received information. For example, a payment system may receive a $750 payment from a customer who is associated with Account 123-008. The payment system may send information related to the payment to one or more of the systems 102a-d, and one or more of the systems 102a-d may electronically submit a credit transaction of $750 to Account 123-008. The generated transactions 110-132 can reside on a database 104, which may be stored on a server or collection of servers. While only a handful of transactions 110-132 are shown in FIG. 1, a typical accounting system 100 typically manages thousands, hundreds of thousands, or even millions of transactions.

Following Generally Accepted Accounting Principles ("GAAP"), a "double entry" system may be employed, in which each transaction has two parts. Value may be transferred from one account to another. For example, a transaction may indicate that $500 has been transferred from Account 123-008 to Account 123-009. As such, the transaction must be recorded in both accounts. A $500 credit entry is applied to Account 123-008, and a $500 debit entry is applied to Account 123-009. In this way, the general ledger reflects a complete record of the transaction.

The information related to the transactions 110-132 may be incorrect, and may be subsequently corrected. In some examples, the information related to the transactions 110-132 is updated without modifying the generated transactions 110-132.

The accounting system 100 includes a general ledger 108 that stores information related to the transactions 110-132. In some examples, the general ledger 108 can be represented as a spreadsheet having rows and columns. Each row of the general ledger 108 is an entry 134-156 that includes information related to a transaction 110-132. For example, the systems 102a-d automatically generate a transaction 110, which is a debit posting of $1,000 to Account 123-001. Entry 134 is shown in the form of a row of the general ledger 108 that includes information related to the transaction 110 (e.g., the entry 134 includes the $1,000 debit posting to Account 123-001). In some examples, the general ledger 108 represents the current compilation of transaction information. That is, a user who would like to view the most reliable and up to date transaction information might look at the general ledger 108.

The general ledger 108 can be accessed and/or displayed by one or more computers 106. The computers 106 can be configured to access the database 104 on which the transactions 110-132 reside (e.g., the computers 106 and the database 104 can be on a same communications network). The general ledger 108 may reside on the same database 104 or at some other location.

In some examples, the systems 102a-d automatically generate a transaction 110-132 that contains incorrect information. For example, a credit or debit transaction may be posted to an account that no longer exists. As another example, a credit or debit transaction may be posted to an account that exists, but the credit or debit may indicate an incorrect amount or be classified to the wrong account. The accounting system 100 allows information related to a transaction 110-132 to be updated to correct errors in the respective transaction 110-132.

Figure 2:
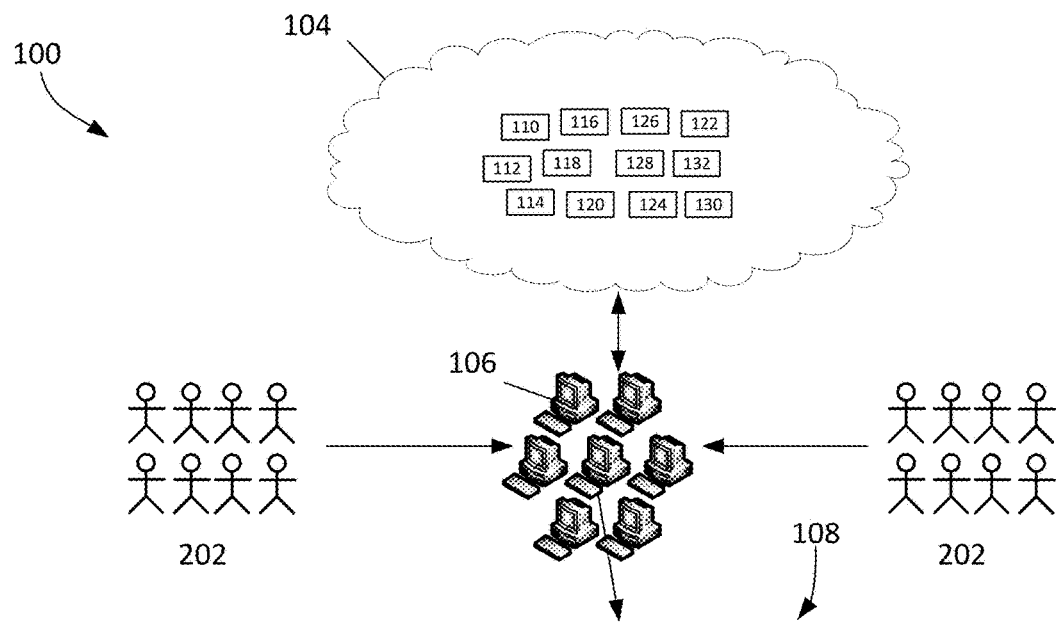
FIG. 2 is a block diagram of an accounting system.

FIG. 2 shows an example of the accounting system 100 of FIG. 1. Authorized users (e.g., members of the accounting staff 202) are able to access the general ledger 108 using the computers 106 in communication with the database 104. The database 104 can be configured to allow editing of the general ledger 108 by members of the account staff 202 in order to update incorrect information related to a transaction 110-132. In some examples, the information related to a transaction 110-132 may be updated in the corresponding entry 134-156 of the general ledger 108 without modifying the underlying transaction 110-132 on the database 104. In some examples, the information related to a transaction 110-132 in the corresponding entry 134-156 of the general ledger 108 as well as the underlying transaction 110-132 on the database 104 are updated. The general ledger 108 can store information related to updates to entries 134-156 that can be used by the correction system 402, as explained below.

Different members of the accounting staff 202 may have different levels of access rights to the general ledger 108. For example, one member of the accounting staff 202 may only have authorization to view the general ledger 108, while another member of the accounting staff 202 may have authorization to both view and edit the general ledger 108 (e.g., to update information related to a transaction 110-132). In some examples, the general ledger 108 may include multiple subparts. Members of the account staff 202 may have different access rights to different subparts. For example, a subpart may be editable by only certain members of the account staff (e.g., one or more members of the accounting staff).

FIG. 3 shows an example of updates to the general ledger 108 by members of the accounting staff 202a-d. The members of the accounting staff 202a-d can access the general ledger 108 using the computers 106 in communication with the database 104. In this example, a member of the accounting staff 202a has access to the entry 138, a member of the accounting staff 202b has access to an entry 140, a member of the accounting staff 202c has access to an entry 142, and a member of the accounting staff 202d has access to an entry 144.

A member of the accounting staff 202a may be tasked with reviewing a set of entries (e.g., including the entry 138) in the general ledger 108. The member 202a sees that the entry 138 indicates that a credit of $800 has been applied to Account 123-002. The entry 138 reflects the transaction 114 (shown in FIGS. 1-2) that was automatically generated by one of the systems 102a-d. However, the member 202a may know that Account 123-002 no longer exists. For example, Account 123-002 may have been acquired by the owner of Account 123-003, and Account 123-002 may have been closed. The systems 102a-d may not be updated to reflect the closing of Account 123-002, so the automatic transactions (e.g., transaction 114 shown in FIGS. 1-2) contain incorrect information. The member 202a manually corrects the information in the general ledger 108 by changing the identified account from a first account to a second account. In this example, the member 202a manually changes the account from "Account 123-002" to "Account 123-003."

Other members of the accounting staff 202b-d may each be tasked with reviewing other sets of entries in the general ledger 108. A second member 202b is in charge of reviewing the entry 140, a third member 202c is in charge of reviewing the entry 142, and a fourth member 202d is in charge of reviewing the entry 144. Like the first member 202a, the other members 202b-d are aware that Account 123-002 no longer exists. The second member 202b manually changes the account listed for the entry 140 from "Account 123-002" to "Account 123-003." The third member 202c manually changes the account listed for the entry 142 from "Account 123-002" to "Account 123-003." The fourth member 202d manually changes the account listed for the entry 144 from "Account 123-002" to "Account 123-003." The manual changes are indicated in FIG. 3 by italics text. The general ledger 108 can store update information related to manual changes to the general ledger 108. The update information can include which entries were updated, which fields were updated, and what the fields were updated from and to.

Figure 4:
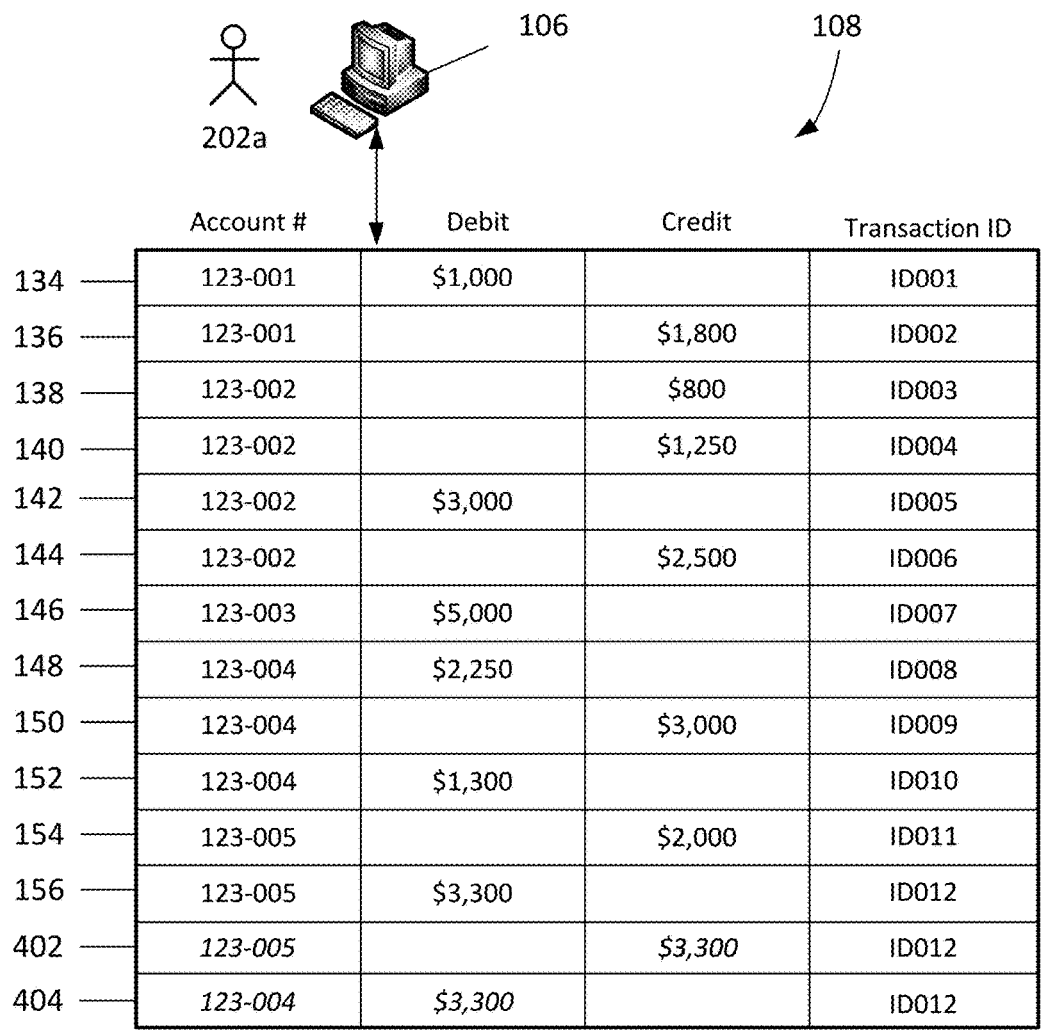
FIG. 4 shows examples of updates made to transaction entries of the accounting system of FIG. 1.

In some examples, a credit or a debit may be applied to the wrong account. Referring to FIG. 4, the member 202a sees that the entry 156 indicates that a debit of $3,300 has been applied to Account 123-005. The entry 156 reflects the transaction 132 (shown in FIGS. 1 and 2) that was automatically generated by one of the systems 102a-d. The transaction 132 has a transaction ID of ID012. The member 202a may know that this debit should have been applied to Account 123-004. The systems 102a-d may be configured to erroneously apply this debit of $3,300 to Account 123-005. As a result, the automatic transactions (e.g., transaction 132 shown in FIGS. 1 and 2) contain incorrect information. The member 202a manually corrects information related to transaction 132 having the transaction ID of ID012. The member 202a manually corrects this information in the general ledger 108 by making an entry 402 crediting Account 123-005 the amount of $3,300 and making an entry 404 debiting Account 123-005 the amount of $3,300. That is, the member 202a manually corrects the erroneous debit with a credit entry, and manually applies the debit to the intended account. We sometimes refer to this manual correction as a reclassification entry. The manual changes are indicated in FIG. 4 by italics text. Other members of the accounting staff 202*b-d* may make similar corrective manual entries involving these same accounts. The manual changes are associated with the same transaction ID as the erroneous automatic transaction (e.g., ID012).

Figure 5A:
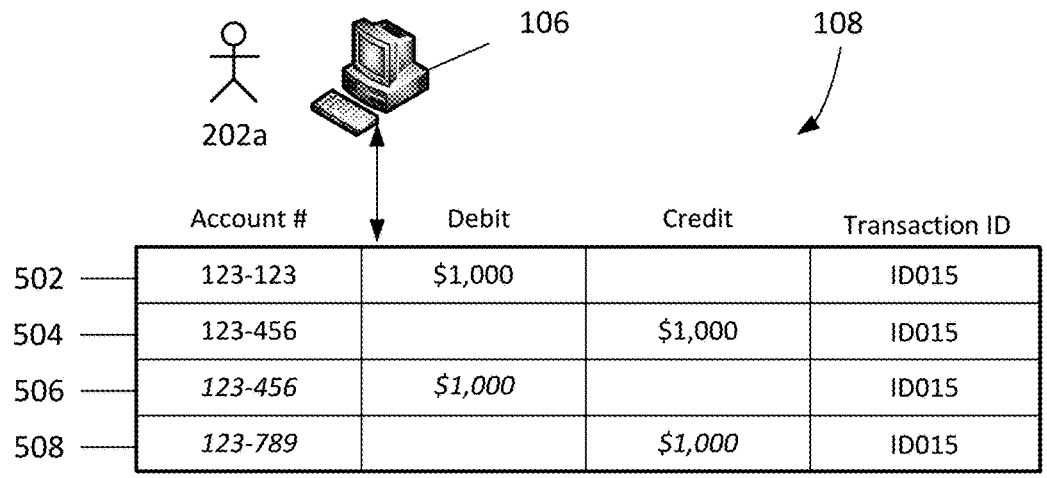
FIGS. 5a and 5b show examples of updates made to transaction entries of the accounting system of FIG. 1.

In some examples, currency may be transferred from a first account to an improper second account. That is, a debit is applied to a first account and a credit is applied to a second account, but the credit should have been applied to a third account. Referring to FIG. 5*a*, the member 202*a* sees that the entry 502 indicates that a debit of $1,000 has been applied to Account 123-123 and entry 504 indicates that a credit of $1,000 has been applied to Account 123-456. The entries 502, 504 are associated with a transaction ID of ID015. Additional information may be available to the member 202*a* that indicates that the entries 502, 504 represent a transfer of currency from Account 123-123 to Account 123-456. The entries 502, 504 reflect transactions that were automatically generated by one of the systems 102*a-d* (shown in FIGS. 1 and 2). However, the member 202*a* may know that this transfer of currency should have been from Account 123-123 to Account 123-789. The systems 102*a-d* may be configured to erroneously apply this transfer from Account 123-123 to Account 123-456. As a result, the automatic transactions contain incorrect information. The member 202*a* manually corrects information related to the entries 502, 504 associated with transaction ID ID015. The member 202*a* manually corrects this information in the general ledger 108 by making an entry 506 debiting Account 123-456 the amount of $1,000 and making an entry 508 crediting Account 123-789 the amount of $1,000. That is, the member 202*a* manually corrects the erroneous credit with a debit entry, and manually applies the credit to the intended account. The manual changes are associated with the same transaction ID as the erroneous automatic transaction (e.g., ID015).

Figure 5B:
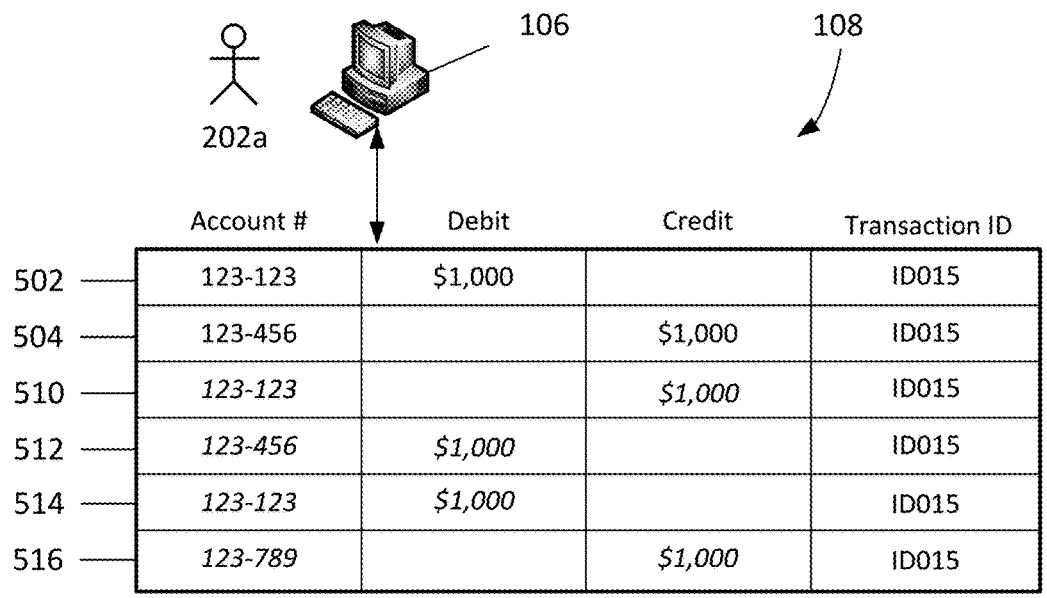

In some examples, the member 202*a* may completely reverse the original erroneous transfer before making corrective entries. Referring to FIG. 5*b*, the member 202*a* makes an entry 510 crediting Account 123-123 the amount of $1,000 and an entry 512 debiting Account 123-456 the amount of $1,000, undoing the original erroneous transfer. The member 202*a* then makes an entry 514 debiting Account 123-123 the amount of $1,000 and an entry 516 crediting Account 123-789 the amount of $1,000, thereby manually creating the intended transfer. The manual changes are indicated in FIGS. 5*a* and 5*b* by italics text. Other members of the accounting staff 202*b-d* may make similar corrective manual entries involving these same accounts.

Figure 6:
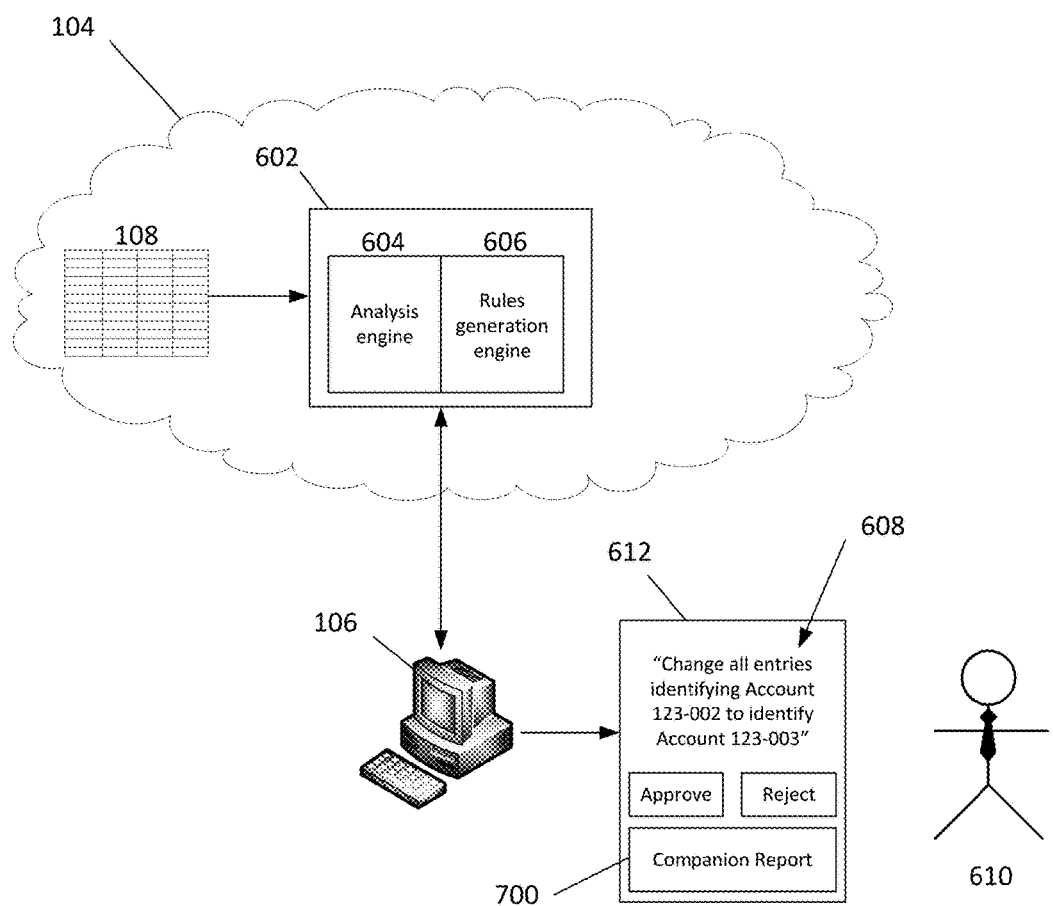
FIG. 6 is a block diagram of an accounting system.

FIG. 6 shows an example of a correction system 602. The correction system 602 includes an analysis engine 604 and a rules generation engine 606. The analysis engine 504 can analyze update information provided by the general ledger 108 to infer a correlation between the updates (e.g., including a correlation between a first account and a second account). When we say that the analysis engine 604 can infer a correlation between a first account and a second account, we mean that the analysis engine 604 can draw a conclusion that a correlation may exist between the first account and the second account. In some examples, the analysis engine 604 infers a correlation between the first account and the second account if characteristics of updates provided by the general leger 108 exceed a particular threshold, as described in more detail below.

In general, when we say that the analysis engine 604 can analyze update information, we mean that the analysis engine 604 can receive information from the general ledger 108 related to updates to entries in the general ledger 108 and interpret the information. The analysis engine 604 may apply an algorithm to the information to infer whether there is a correlation between a first account and a second account. For example, a set of rules and calculations can be applied to the information to infer whether a correlation between a first account and a second account exists. The algorithm may consider the information from the general ledger 108 as well as other information unrelated to the general ledger 108. The algorithm may consider information such as the number of entries in the general ledger 108 that were updated, the contents of the updates, which entries were updated, etc. The algorithm may be modifiable by a user. That is, the algorithm may be configured to enable a user to adjust parameters that affect the requirements for inferring a correlation between a first account and a second account. For example, one or more statistical confidence tests can consider user-adjustable parameters as input for inferring whether a correlation exists. The statistical confidence tests can infer whether there is a correlation between a first account and a second account that has a particular statistical confidence within a confidence interval. Both the particular statistical confidence and the confidence interval can be configurable by the user.

The analysis engine 604 can consider additional information to infer whether there is a correlation between a first account and a second account. For example, the analysis engine 604 may consider the total number of entries in the general ledger 108 that originally identified Account 123-002, and determine a percentage of these entries in which Account 123-002 was changed to Account 123-003. The analysis engine 604 may also consider manual corrections to debit or credit entries that were applied to the wrong account. In this example, the analysis engine 604 observes that four entries in the general ledger 108 identifying Account 123-002 were updated to identify Account 123-003. If, as in this example, the general ledger 108 originally included only six entries identifying Account 123-002 (only four of these entries being shown in the general ledger 108), the analysis engine 604 may infer a correlation between Account 123-002 and Account 123-003 because 67% of entries identifying Account 123-002 were updated to identify Account 123-003. However, if the general ledger 108 originally included 4,000 entries identifying Account 123-002, the analysis engine 604 may determine that no correlation between Account 123-002 and Account 123-003 exists because only 0.1% of entries identifying Account 123-002 were updated to identify Account 123-003. In this way, the analysis includes a determination of a percentage of the updates in which the account identified by a respective transaction was changed from the original account (Account 123-002) to the updated account (Account 123-003).

In some examples, a correlation between the first account and the second account can be inferred based on a functional dependency technique and/or a census technique, as described in greater detail below with respect to FIGS. 14*a-f* and 15*a-f*, and as described in U.S. Pat. No. 8,868,580, titled "Data Profiling" and issued on Oct. 21, 2014, which is hereby incorporated by reference in its entirety. For example, the analysis engine 604 may infer a correlation between a first account and a second account based on a pattern of reclassification entries.

In some examples, the analysis engine 604 may observe that automatic entries into a first account may frequently result in a reclassification entry into a second account. That is, an automatic debit or credit that is applied to a first account may be manually reversed, and following the reversal, a debit or credit of the same amount may be applied to a second (intended) account. The analysis engine 604 may consider the amount of time that passes between the reversal of the entry to the first account and the application of the credit or debit to the second account.

In some examples, the analysis engine 604 may observe that a balance in a first account is frequently manually zeroed out by applying a credit to the first account, and a balance of the same amount is transferred to a second account by manually applying a debit to the second account. In some examples, only a portion of the balance of the first account is transferred to the second account in the manner described above.

In some examples, the analysis engine 604 may observe that multiple credit or debits that are applied to a first account sum up to the exact amount of a single credit or debit entry into a second account.

In some examples, the analysis engine 604 may observe that a particular type of credit or debit is frequently reclassified into a second account after it has been automatically applied to a first account. For example, the analysis engine 604 may observe that transactions from a particular person, from a particular business unit, for a particular transaction type, or for a particular product are always reclassified from the first account into the second account. The analysis engine 604 may consider a combination of these or any other factors.

If the analysis engine 604 infers a correlation between a first account and a second account, the rules generation engine 606 generates a rule 608. In this example, the rule 608 would "change all entries identifying Account 123-002 to identify Account 123-003." In some examples, the rule may propose to reclassify all credits or debits, or particular credits or debits, that were automatically applied to a first account to a second account in the future. The rule 608 is provided to a recordkeeping manager (e.g., a rule approver 610) who can approve or reject the rule 608. The rule 608 can be provided by a rules interface 612 that is configured to provide, to the rule approver 610, one or more rules generated by the rules generation engine 606. The rules interface 612 can be configured to receive, from the rule approver 610, approval for one or more of the rules. For example, the rules interface 612 can include an "approve" and a "reject" option that can be selected by the rule approver. The rule approver 610 can be an entity authorized to modify transaction entries received by the accounting system 100. For example, the rule approver 610 may be an account manager who manages members of the accounting staff (e.g., the members 202*a-d* shown in FIG. 3). The rules interface 612 can include an option to access a companion report 700 that includes information related to the rule 608. Referring to FIG. 7, the companion report 700 can include a percentage of times the account identification was updated by members of the accounting staff, an estimate of labor costs of the manual updates, example changes to the general ledger 108 if the rule were approved, and the materiality of the changes to the general ledger 108 over a time period. The materiality of the changes to the general ledger 108 over a time period can indicate material reclassifications that occurred in the accounts that are related to the rule 608. A material reclassification may one that exceeds a threshold amount. For example, a manual change that involves a credit or debit that exceeds $10,000 may be considered material. In some examples, a manual change may be considered material if it involves a credit or debit that exceeds a particular percentage of the sum of the balances of all accounts of a particular type. The particular percentage may be adjustable by a user of the accounting system.

The rule approver 610 can view the companion report 700 before approving or rejecting the rule 608. In this example, the analysis engine 604 inferred a correlation between Account 123-002 and Account 123-003 because four out of six entries in the general ledger 108 identifying Account 123-002 were updated to identify Account 123-003. In this example, the two entries that were not updated are reflected in the companion report 700. If the rule approver 610 approves the rule 608, then future transactions generated by the systems 102*a-d* that identify Account 123-002 will be automatically updated to identify Account 123-003. Therefore, the rule approver 610 may choose to investigate the reason why two of the six entries in the general ledger 108 identifying Account 123-002 were not updated. For example, if the rule approver 610 knows that Account 123-002 has been closed and absorbed by Account 123-003, and if the rule approver 610 knows that the two entries that were not updated have not yet been reviewed by members of the accounting staff, the rule approver 610 may approve the rule. On the other hand, if the rule approver 610 knows that it is only appropriate to update certain transactions that identify Account 123-002 to identify Account 123-003, the rule approver 610 may reject the rule. In this way, the rule can be finalized based on information known to a person having decision-making authority.

Figure 8:
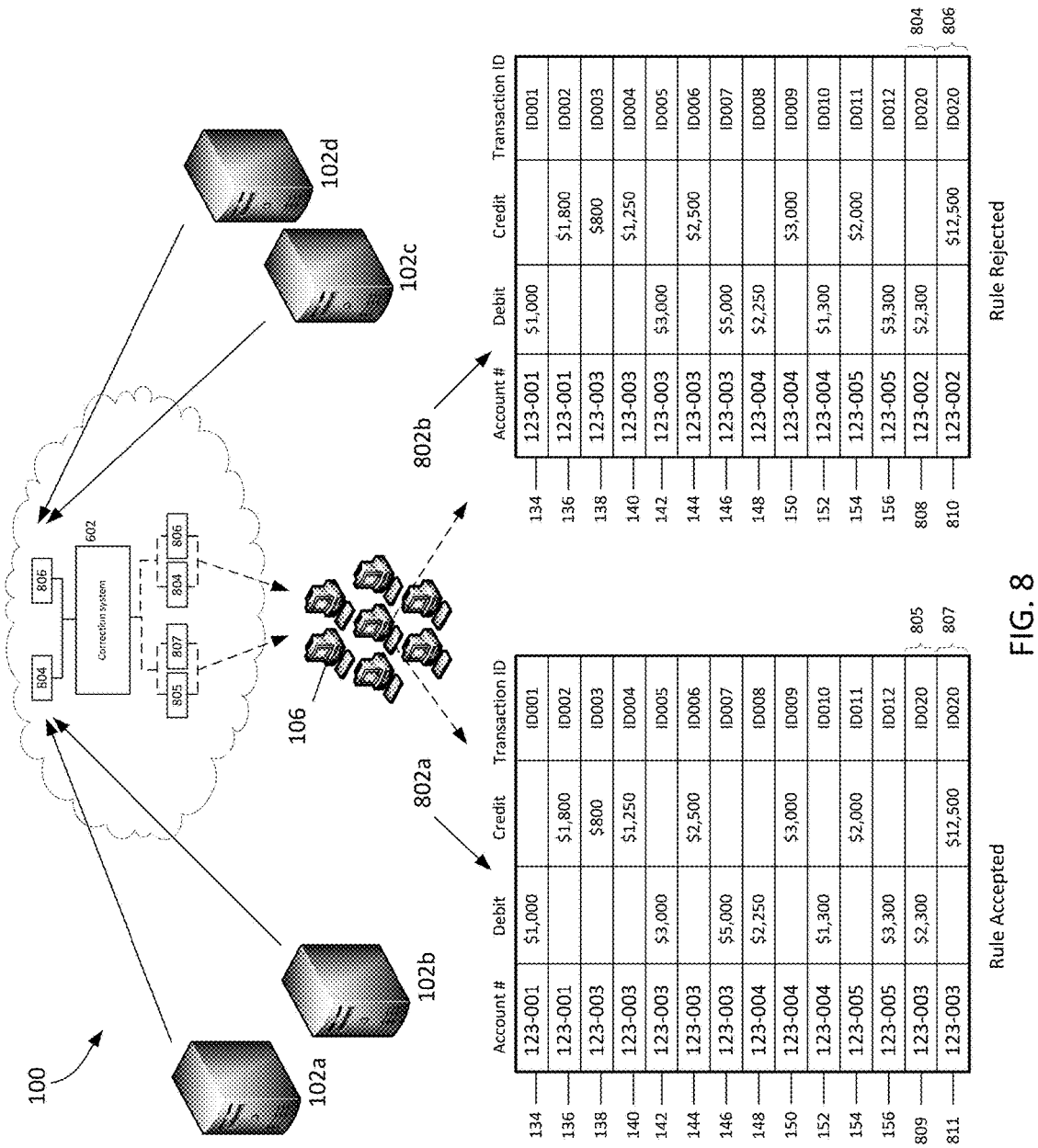
FIG. 8 is a block diagram of an accounting system.

FIG. 8 shows an example of the accounting system 100 after the rule 608 has been either approved or rejected. The systems 102*a-d* automatically generate transactions 804, 806. One transaction 804 indicates a debit posting of $2,300 to Account 123-002, and another transaction 806 indicates a credit posting of $12,500 to Account 123-002. The correction system 602 analyzes generated transactions (e.g., the transactions 804, 806 shown in the figure) to determine whether any approved rules apply to them.

If the rule 608 were approved by the rule approver 610, the correction system 602 would determine that the rule 608 applies to the transactions 804, 806 because they each identify Account 123-002. The correction system 602 would update the transactions 804, 806 to create updated transactions 805, 807 that identify Account 123-003 instead of Account 123-002. These updates would be reflected in the general ledger 802*a*. That is, the entries 809, 811 of the general ledger 802*a* would include information related to the updated transactions 805, 807.

If the rule 608 were rejected by the rule approver 610, the correction system 602 would determine that no rule applies to the transactions 804, 806. The correction system 602 would leave the transactions 804, 806 unmodified. In that scenario, the entries 808, 810 of the general ledger 802*b* would include the original, unmodified information related to the transactions 804, 806.

Figure 9:
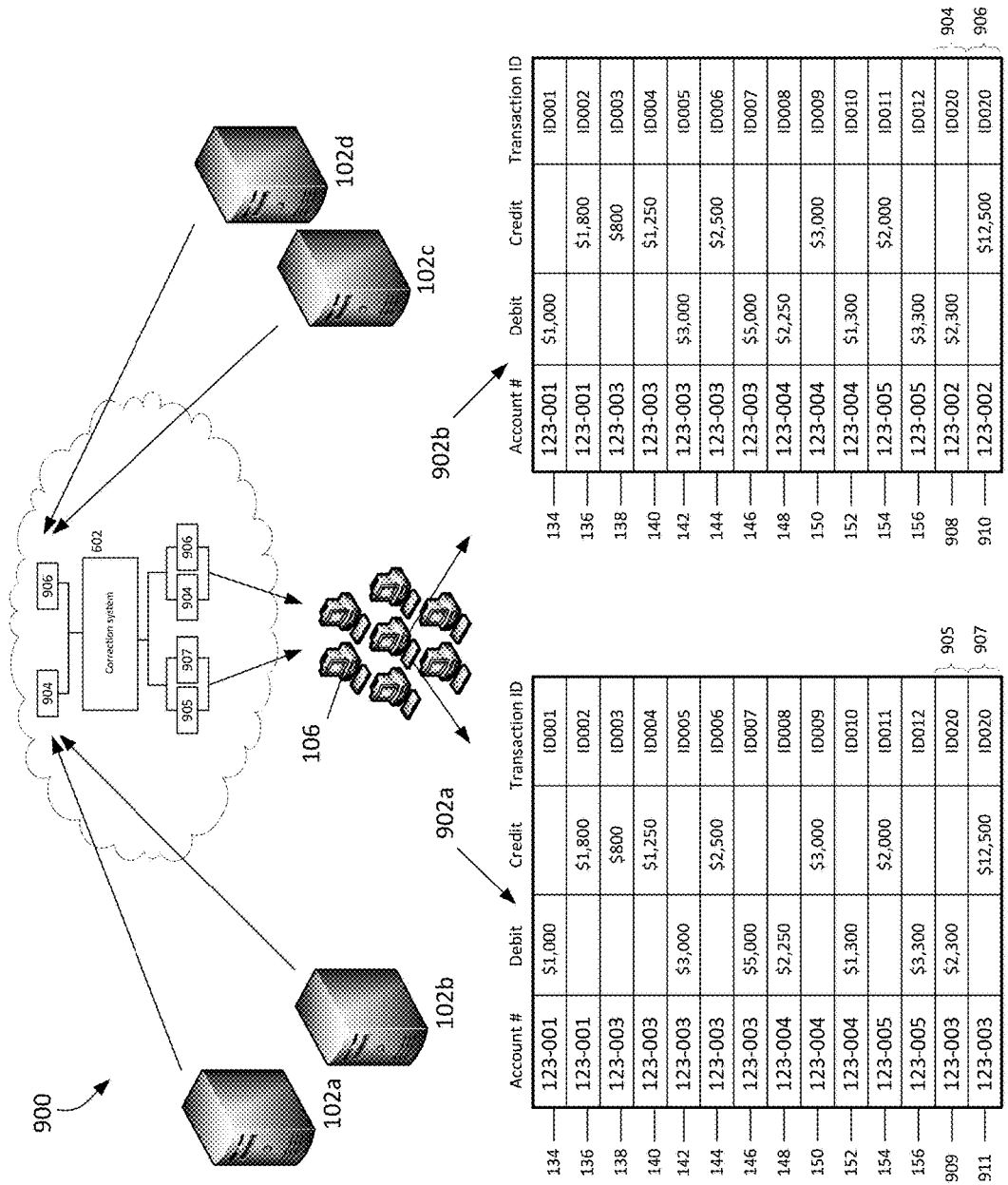
FIG. 9 is a block diagram of an accounting system test environment.

FIG. 9 shows an example of a test environment 900 for an approved rule (e.g., rule 608). The rule approver 610 may be unsure whether the rule 608 should be approved or rejected. The test environment 900 enables the rule approver 610 to observe the impact that the accepted rule 608 will have on the accounting system 100 without applying the rule 608 to all instances of the general ledger. In this example, the rule 608 is approved by the rule approver 510, and the correction system 602 creates instances of updated transactions 905, 907 that identify Account 123-003 instead of Account 123-002, but the correction system 602 only updates entries in a first instance of the general ledger 902*a* according to the approved rule 608. That is, the entries 909, 911 of the first instance of the general ledger 902a include information related to the instances of updated transactions 905 and 907. Other instances of the general ledger (e.g., a second instance of the general ledger 902b) remain unmodified, as if the rule 608 was not approved. That is, the entries 908, 910 of the second instance of the general ledger 902b include information related to the transactions 904, 906. By updating only entries in a first instance of the general ledger 902a based on the rule, in parallel with a second instance of the ledger that is not updated based on the rule, the rule approver 610 may revert back to the second instance of the general ledger 902b if the rule 608 does not perform as desired (e.g., if the rule 608 changes entries of the general ledger that should not have be changed).

Figure 10:
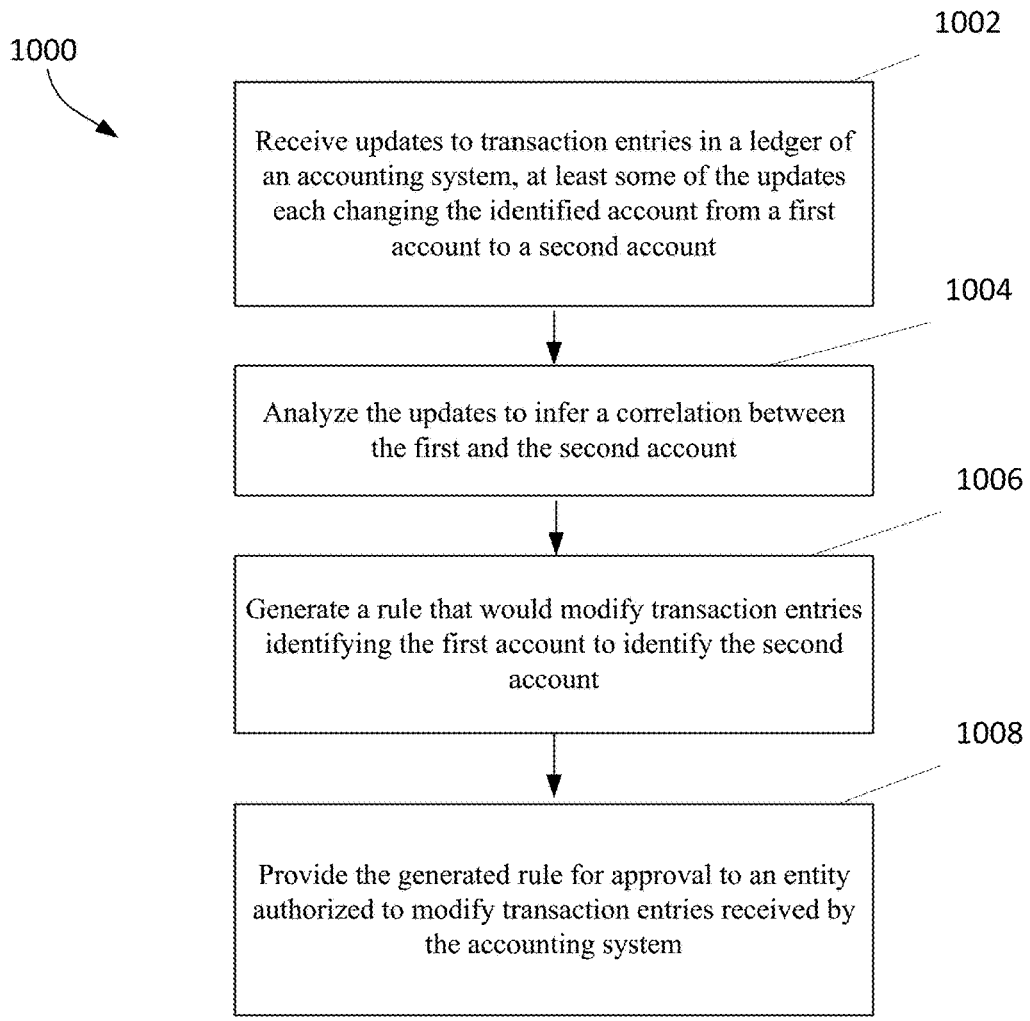
FIG. 10 is a flow chart illustrating a technique for generating a rule for the accounting system of FIG. 1.

FIG. 10 is a flowchart illustrating a technique for updating transaction entries in a ledger of an accounting system. Updates to transaction entries are received in the ledger of the accounting system (1002). Members of the accounting staff (e.g., the members 202 of FIG. 2) may manually update information related to a transaction by editing the ledger. Each transaction entry identifies an account that corresponds to the transaction. At least some of the updates each change the identified account from a first account to a second account. At least some of the updates can be submitted by multiple users of the accounting system. The ledger can store update information related to the updates to the ledger. The update information can include which entries were updated, which fields were updated, and what the fields were updated from and to.

The updates are analyzed to infer a correlation between the first account and the second account (1004). The updates can be analyzed by an analysis engine (e.g., the analysis engine 604 of FIG. 6). The analysis can include an analysis of the update information related to the updates to the ledger to infer a correlation between the updates. The analysis can consider the total number of entries in the general ledger that originally identified the first account. The analysis includes a determination of a percentage of the transaction entries in the ledger that identified the first account that were changed to identify the second account.

A rule is generated that, if applied to transaction entries received by the accounting system, would modify transaction entries identifying the first account to identify the second account (1006). The rule can be generated by a rules generation engine (e.g., the rules generation engine 606 of FIG. 6). In some examples, the rule is only applied to transaction entries in a first instance of the ledger.

The generated rule is provided for approval to an entity authorized to modify transaction entries received by the accounting system (1008). The entity authorized to modify transaction entries may be an account manager who manages members of the accounting staff (e.g., the members 202 of FIG. 2). The rule may include a companion report (e.g., the companion report 700 of FIG. 7) that includes information related to the generated rule. If the entity authorized to modify transactions approves the rule, then future transaction entries that identify the first account will be automatically updated to identify the second account.

Figure 11:
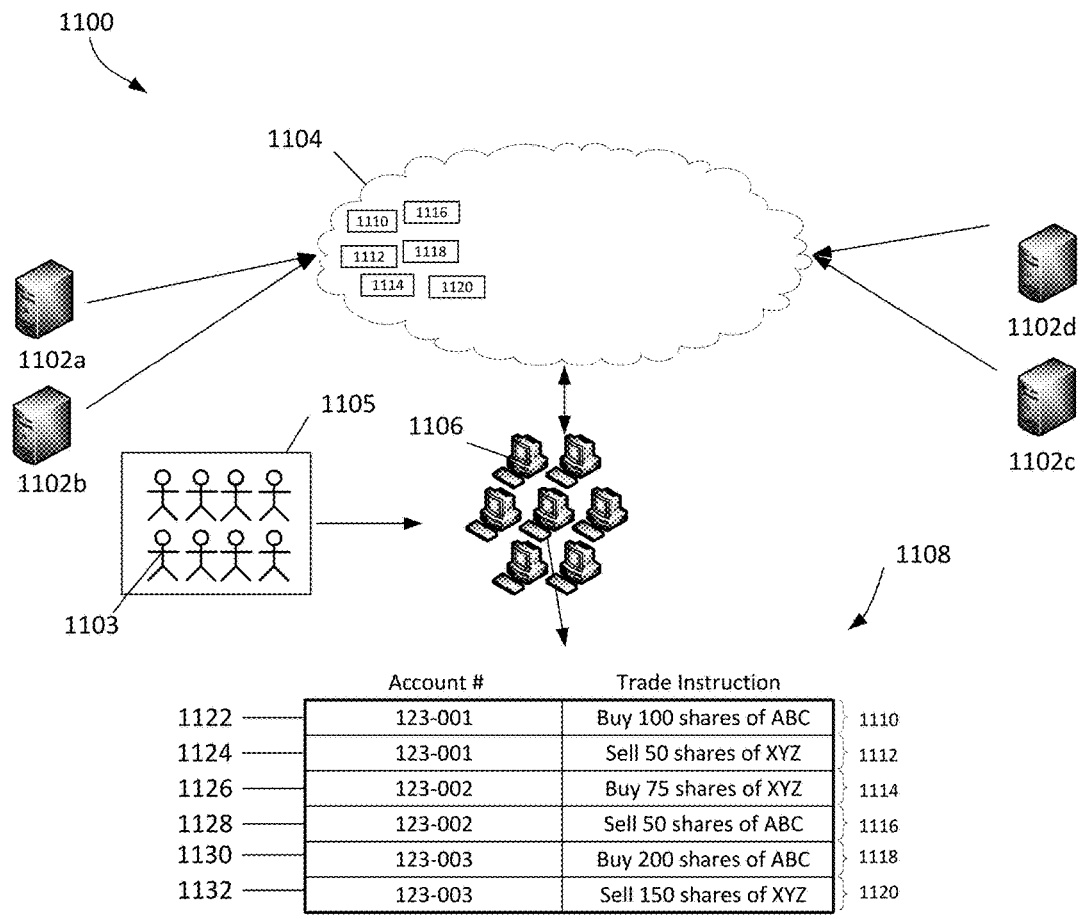
FIG. 11 is a block diagram of a securities trading system.

FIG. 11 shows an example of a recordkeeping system. The recordkeeping system is a securities trading system 1100 for managing records (e.g., securities trade instructions 1110-1120). The securities trading system 1100 may be operated by a securities brokerage. The securities trade instructions 1110-1120 can include an account and a trade instruction. For example, a securities trade instruction could indicate that a particular security (e.g. a stock, bond, mutual fund, exchange-traded fund) is to be traded in Account 123-001. For example, the securities trade instruction could indicate that a quantity of a particular security is to be bought or sold.

The securities trading system 1100 includes one or more systems 1102a-d (e.g., computer systems) that can automatically generate the securities trade instructions 1110-1120 in response to receiving information related to the securities trade instructions 1110-1120 from another source. The securities trade instructions 1110-1120 can be generated based on the received information and the securities trade instructions 1110-1120 can include the received information. The securities trade instructions 1110-1120 can reside on a database 1104, which may be stored on a server or collection of servers.

The information related to the securities trade instructions 1110-1120 may be incorrect, and may be subsequently corrected.

The securities trading system 1100 can include a spreadsheet 1108, having rows and columns, that stores information related to the securities trade instructions 1110-1120. Each row of the spreadsheet 1108 is an entry 1122-1132 that includes values of the securities trade instruction 1110-1120. The securities trading system 1100 can be configured to receive, from multiple users 1103 of the system, manual updates to the values of the securities trade instructions 1110-1120. The updates can be received from a system of a middle office 1105 of the securities brokerage. The system of the middle office 1105 may be controlled by the multiple users 1103. In some examples, the manual updates to the values can be made directly on the spreadsheet 1108. The updates to the values of the securities trade instructions 1110-1120 can include changing an error in at least some of the securities trade instructions 1110-1120.

For example, the systems 1102a-d automatically generate a securities trade instruction 1110, which is an instruction to trade a particular security in Account 123-001. An entry 1122, shown in the form of a row of the spreadsheet 1108, includes information related to the securities trade instruction 1110 (e.g., the entry 1122 includes the instruction to trade a particular security to Account 123-001). The values of the securities trade instruction 1110 can be updated on the spreadsheet 1108.

The spreadsheet 1108 can be accessed and/or displayed by one or more computers 1106. The computers 1106 can be configured to access the database 1104 on which the securities trade instructions 1110-1120 reside (e.g., the computers 1106 and the database 1104 can be on a same communications network). The spreadsheet 1108 may reside on the same database 1104 or at some other location.

The securities trading system 1100 can include an analysis engine configured to identify patterns among the updates received from the multiple users 1103 and/or the system of the middle office 1105. The securities trading system 1100 can include a rules generation engine configured to generate rules based on the patterns identified by the analysis engine. The securities trading system 1100 can include a rules interface configured to provide, to a recordkeeping manager (e.g., a securities trading manager), one or more rules generated by the rules generation engine, and receive, from the recordkeeping manager, approval for one or more of the rules. The analysis engine and the rules generation engine operate in a similar fashion as the analysis engine 604 and the rules generation engine 606 shown in FIG. 6.

Figure 12:
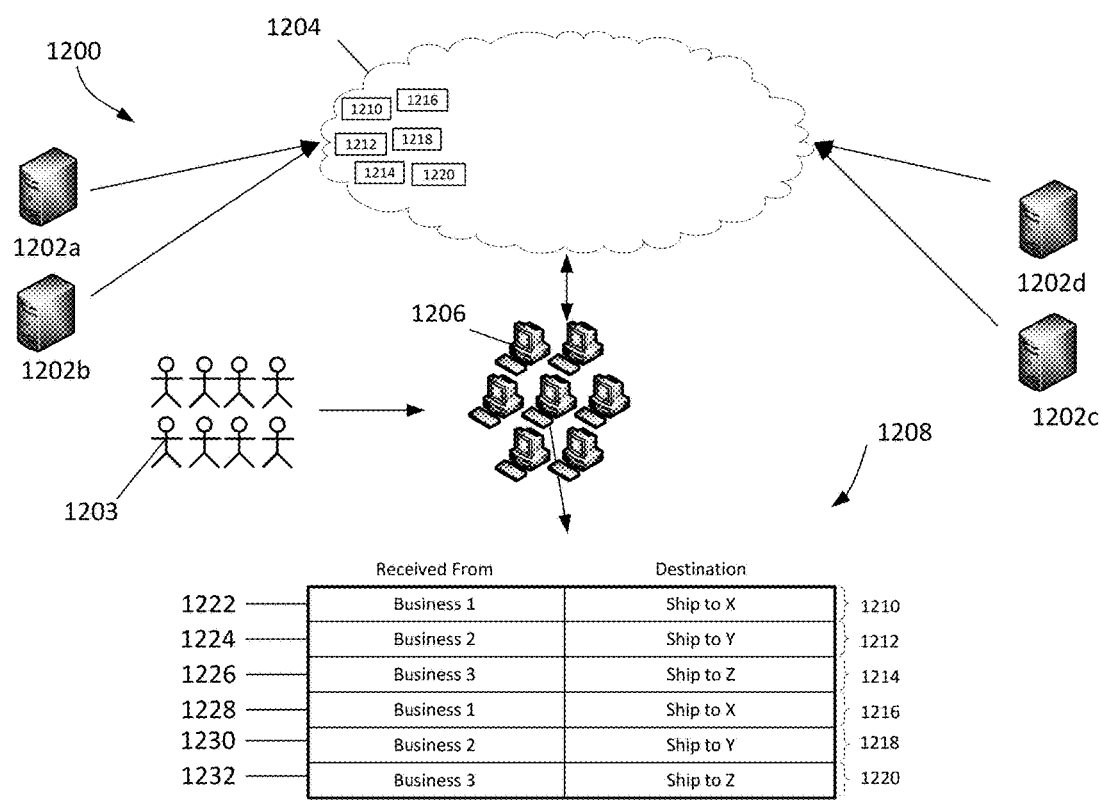
FIG. 12 is a block diagram of a recordkeeping system operated by a freight forwarder.

FIG. 12 shows an example of a recordkeeping system 1200 operated by a freight forwarder. The recordkeeping system 1200 is used for managing records (e.g., shipment instructions 1210-1220). The shipment instructions 1210-1220 can include a "received from" field and a "destination"

field. For example, a shipment instruction could indicate that a certain item was received from Business 1, and should be shipped to destination X.

The recordkeeping system 1200 includes one or more system 1202*a-d* (e.g., computer systems) that can automatically generate the shipment instructions 1210-1220 in response to receiving information related to the shipment instructions 1210-1220 from another source. The shipment instructions 1210-1220 can be generated based on the received information, and the shipment instructions 1210-1220 can include the received information. The shipment instructions 1210-1220 can reside on a database 1204, which may be stored on a server or collection of servers.

The information related to the shipment instructions 1210-1220 may be incorrect, and may be subsequently corrected.

The recordkeeping system 1200 can include a spreadsheet 1208, having rows and columns, that stores information related to the shipment instructions 1210-1220. Each row of the spreadsheet 1208 is an entry 1222-1232 that includes values of the shipment instruction 1210-1220. The recordkeeping system 1200 can be configured to receive, from multiple users 1203 of the system, manual updates to the values of the shipment instruction 1210-1220. In some examples, the manual updates to the values can be made directly on the spreadsheet 1208. The updates to the values of the shipment instructions 1210-1220 can include changing an error in at least some of the shipment instructions 1210-1220.

For example, the systems 1202*a-d* automatically generate a shipment instruction 1210, which is an instruction to ship an item received from Business 1 to Destination X. An entry 1222, shown in the form of a row of the spreadsheet 1208, includes information related to the shipment instruction 1210 (e.g., the entry 1222 includes the instruction to ship the item received from Business 1 to Destination X). The values of the shipment instruction 1210 can be updated on the spreadsheet 1208.

The spreadsheet 1208 can be accessed and/or displayed by one or more computers 1206. The computers 1206 can be configured to access the database 1204 on which the shipment instructions 1210-1220 reside (e.g., the computers 1206 and the database 1204 can be on a same communications network). The spreadsheet 1208 may reside on the same database 1204 or at some other location.

The recordkeeping system 1200 can include an analysis engine configured to identify patterns among the updates received from the multiple users 1203. The recordkeeping system 1200 can include a rules generation engine configured to generate rules based on the patterns identified by the analysis engine. The recordkeeping system 1200 can include a rules interface configured to provide, to a recordkeeping manager (e.g., a shipping manager), one or more rules generated by the rules generation engine, and receive, from the recordkeeping manager, approval for one or more of the rules. The analysis engine and the rules generation engine operate in a similar fashion as the analysis engine 604 and the rules generation engine 606 shown in FIG. 6.

Figure 13:
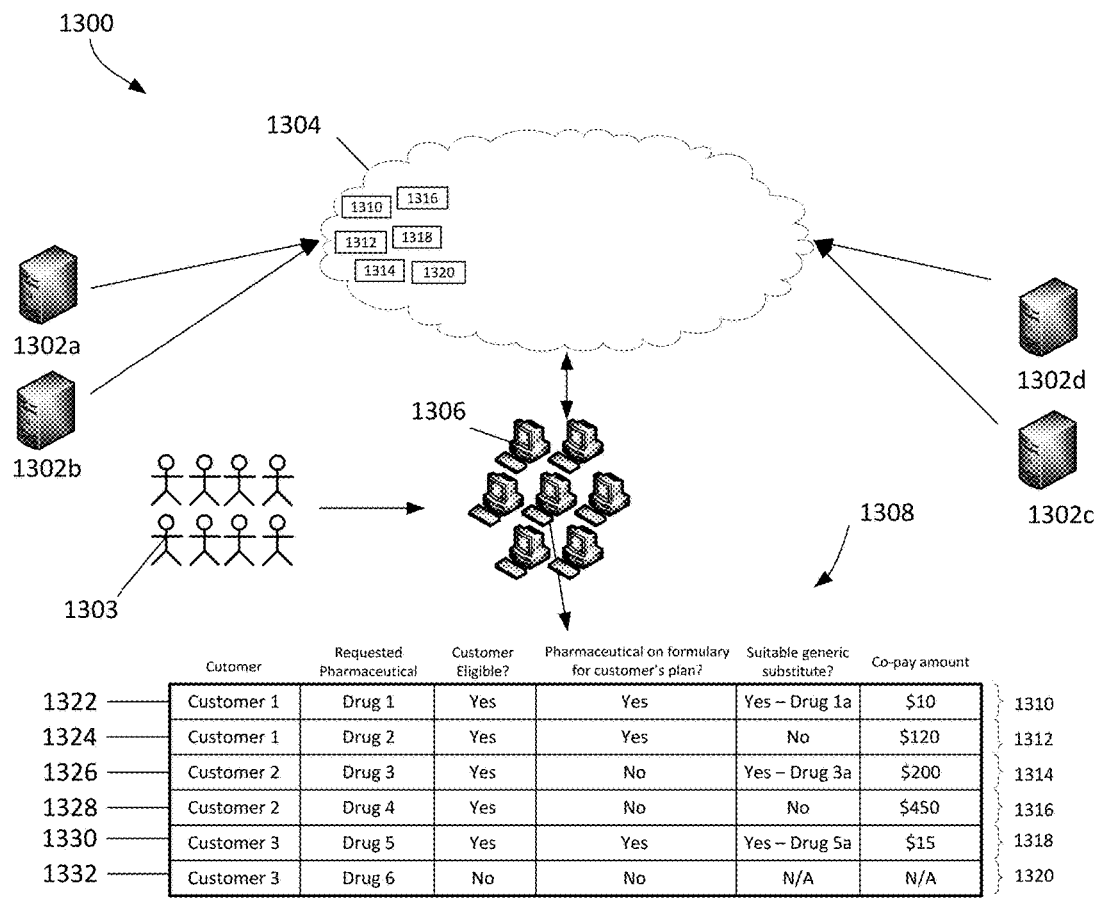
FIG. 13 is a block diagram of a recordkeeping system operated by an entity that manages pharmaceutical benefits.

FIG. 13 shows an example of a recordkeeping system 1300 operated by an entity that manages pharmaceutical benefits. The recordkeeping system 1300 is used for managing records (e.g., requests 1310-1320). The requests 1310-1320 can be requests to approve a pharmaceutical purchase. The requests 1310-1320 can include a "customer" field, a "requested pharmaceutical" field, a customer eligibility field, a pharmaceutical eligibility field, a generic substitute field, and a "co-pay amount" field. The request can be processed by the entity that manages pharmaceutical benefits to determine at least one of i) whether a customer associated with the request is eligible for a particular health coverage, ii) whether the pharmaceutical is on a formulary for a health plan associated with the customer, iii) whether a generic pharmaceutical can be substituted for the pharmaceutical, and iv) a co-pay amount to be collected as part of the purchase. For example, a request could indicate that Customer 1 has requested Drug 1, Customer 1 is eligible for Drug 1, Drug 1 is on the formulary for the health plan associated with Customer 1, there is a suitable generic substitute (Drug 1a) for Drug 1, and a co-pay amount of $10 should be collected from Customer 1.

The recordkeeping system 1300 includes one or more system 1302*a-d* (e.g., computer systems) that can automatically generate the requests 1310-1320 in response to receiving information related to the requests 1310-1320 from another source. The requests 1310-1320 can be generated based on the received information and the requests 1310-1320 can include the received information. The requests 1310-1320 can reside on a database 1304, which may be stored on a server or collection of servers.

The information related to the requests 1310-1320 may be incorrect, and may be subsequently corrected.

The recordkeeping system 1300 can include a spreadsheet 1308, having rows and columns, that stores information related to the requests 1310-1320. Each row of the spreadsheet 1308 is an entry 1322-1332 that includes values of the requests 1310-1320. The recordkeeping system 1300 can be configured to receive, from multiple users 1303 of the system, manual updates to the values of the requests 1310-1320. In some examples, the manual updates to the values can be made directly on the spreadsheet 1308. The updates to the values of the requests 1310-1320 can include changing an error in at least some of the requests 1310-1320. The updates to the values of the records can include manual corrections to at least some of the requests which could not be approved automatically.

For example, the systems 1302*a-d* automatically generate a request 1310, which is a request by Customer 1. Customer 1 has requested Drug 1, Customer 1 is eligible for Drug 1, Drug 1 is on the formulary for the health plan associated with Customer 1, there is a suitable generic substitute (Drug 1a) for Drug 1, and a co-pay amount of $10 should be collected from Customer 1. An entry 1322, shown in the form of a row of the spreadsheet 1308, includes information related to the request 1310. The values of the request 1310 can be updated on the spreadsheet 1308.

The spreadsheet 1308 can be accessed and/or displayed by one or more computers 1306. The computers 1306 can be configured to access the database 1304 on which the requests 1310-1320 reside (e.g., the computers 1306 and the database 1304 can be on a same communications network). The spreadsheet 1308 may reside on the same database 1304 or at some other location.

The recordkeeping system 1300 can include an analysis engine configured to identify patterns among the updates received from the multiple users 1303. The recordkeeping system 1300 can include a rules generation engine configured to generate rules based on the patterns identified by the analysis engine. The recordkeeping system 1300 can include a rules interface configured to provide, to a recordkeeping manager (e.g., a pharmaceutical manager), one or more rules generated by the rules generation engine, and receive, from the recordkeeping manager, approval for one or more of the rules. The analysis engine and the rules generation engine operate in a similar fashion as the analysis engine 604 and the rules generation engine 606 shown in FIG. 6.

As described above, a correlation between a first account and a second account can be inferred based on a functional dependency technique. FIG. 14*a* shows examples of updates 1402 made to the general ledger 108 of FIG. 1. The updates 1402 are identified according to the Transaction ID. The updates 1402 are joined with the general ledger 108 to create an updated general ledger 1404, as shown in FIG. 14*b*.

Functional Dependency Technique

A functional dependency test can be performed on the updated general ledger 1404 to infer a correlation between a first account (e.g., Account 123-002) and a second account (e.g., Account 123-003). In this example, the functional dependency test identifies that 100% of the time, when the original account is Account 123-002, the account number is updated—and specifically, the account number is updated to be Account 123-003 100% of the time. Based on the results of the functional dependency test, a rule may be proposed that states:

If Account #="123-002" then create a change record to make Account #="123-003"

The proposed rule can be reviewed, tested, and implemented according to the techniques described above.

In some implementations, not every Transaction ID having the original Account 123-002 is updated. Or, for example, not every Transaction ID having the original Account 123-002 is updated to be the new Account 123-003. In such examples, a correlation may be inferred between the first account and the second account, but the correlation will have less than 100% certainty. FIG. 14*c* shows another example of an updated general ledger 1406 for which Transaction ID ID006 was not updated. In such an example, there is only a 75% correlation between the original Account 123-002 being updated to be the new Account 123-003.

In some implementations, the functional dependency algorithm identifies unique Original Account #/New Account # pairs and counts instances of those unique pairs. A uniqueness test can then be performed on one of the fields of the pair. For example, performing a uniqueness test on the updated general ledger 1406 of FIG. 14*c* may produce the dataset 1408 shown in FIG. 14*d*. In some implementations, the functional dependency test considers all unique Original Account #/New Account # pairs. However, in some implementation (e.g., implementations in which corrected transactions are of particular interest), the only Original Account #'s that are considered are those that include instances in which the Original Account # was updated to be a New Account #. The dataset 1410 represents the instances that are considered in such an implementation. Based on the dataset 1410, a correlation can be inferred that the Original Account 123-002 is updated to be the New Account 123-003 75% of the time.

In some implementations, the functional dependency approach can consider multiple conditions (e.g., corresponding to multiple columns). For example, FIG. 14*e* shows another example of an updated general ledger 1412 that includes multiple updates for Original Account 333-002 to New Account 333-100 and multiple updates for Original Account 333-003 to New Account 333-110. The functional dependency may be performed according to an algorithm that can attempt multiple heuristics, and heuristics that result in a functional dependency match may result in the proposal of a rule. Referring to the updated general ledger 1412, the functional dependency algorithm may first determine that Original Account 333-002 is updated to New Account 333-100 75% of the time, and Original Account 333-003 is updated to New Account 333-110 80% of the time. However, if the functional dependency algorithm considers a second heuristic (e.g., whether the amount of the transaction is greater than or equal to $1,000), the correlation may change.

FIG. 14*f* shows a set of reduced data 1414 that identifies not only the updates of an Original Account # to a New Account #, but also whether such updates involved a transaction of greater than or equal to $1,000. The functional dependency algorithm considers both of the heuristics and is applied to the reduced data 1414, resulting in the dataset 1416. The dataset 1416 identifies unique combinations of the heuristics and counts instances of each unique combination, and correlations can be inferred based on the dataset 1416. For example, while the Original Account 333-002 is updated to New Account 333-100 only 75% of the time, a 100% correlation exists when the Original Account 333-002 is updated to New Account 333-100 and the transaction amount is greater than or equal to $1,000. Similarly, while the Original Account 333-003 is updated to New Account 333-110 only 80% of the time, a 100% correlation exists when the Original Account 333-003 is updated to New Account 333-110 and the transaction amount is greater than or equal to $1,000. Based on the results of such a functional dependency test, two rules may be proposed that state:

If Account #="333-002" and Amount >=$1,000 then create a change record to make Account #="333-100"

If Account #="333-003" and Amount >=$1,000 then create a change record to make Account #="333-110"

Census Technique

Figure 15A:
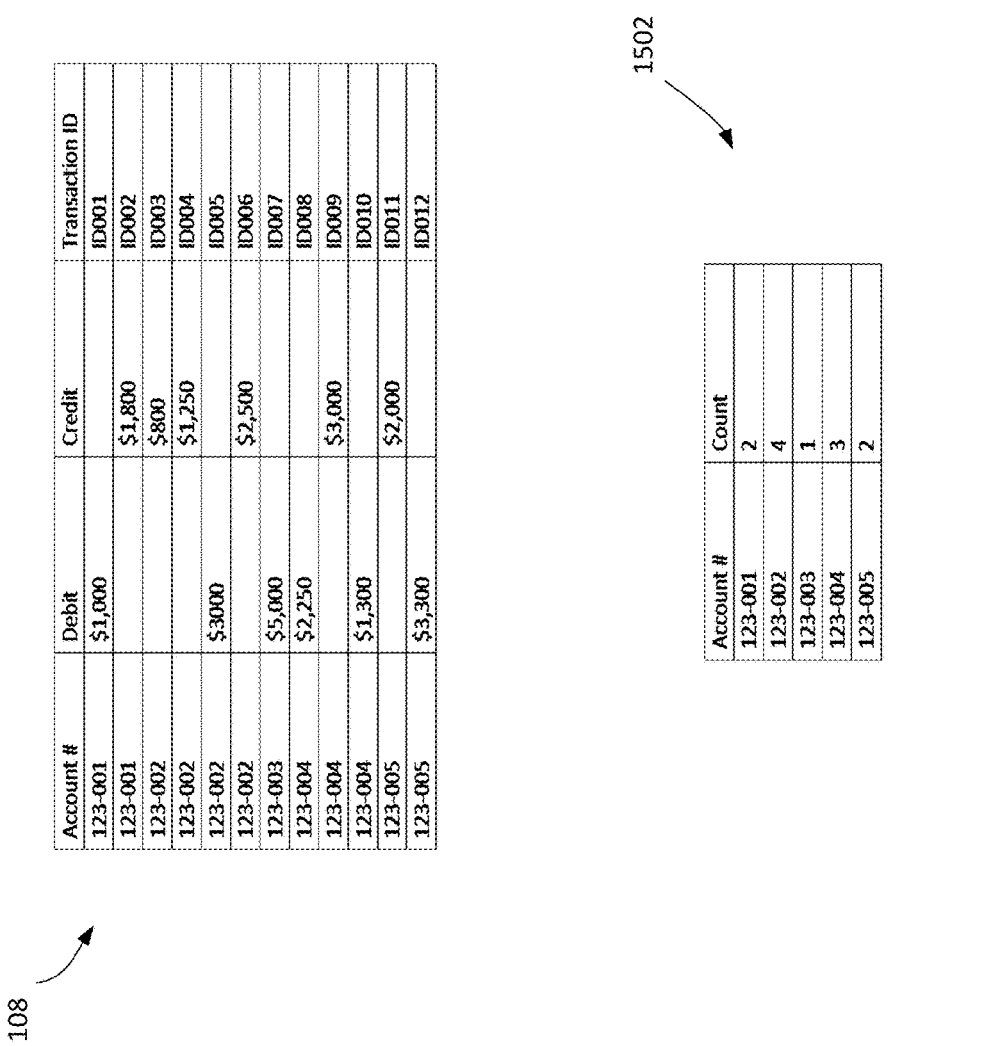
Figure 15B:
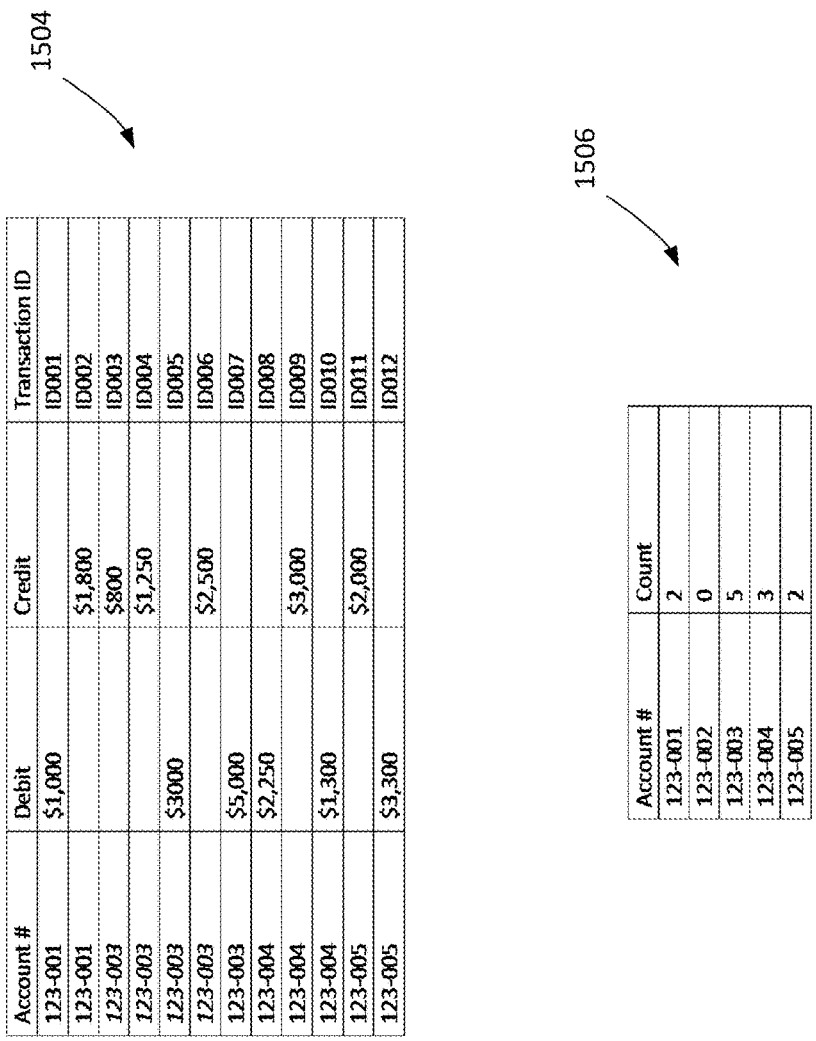

A correlation between a first account and a second account can also be inferred based on a census technique. The census technique may involve counting the number of values that appear in a particular dataset. For example, FIG. 15*a* shows the general ledger 108 of FIG. 1 and an associated census 1502. FIG. 15*b* shows an updated general ledger 1504. Specifically, the four transactions with Account #123-002 have been updated to have Account #123-003. The updated general ledger 1504 also has an associated census 1506. The two censuses 1502, 1506 can be merged to form the combined census 1508 of FIG. 15*c*, and lines of the combined census 1508 that remain unchanged across the two censuses 1502, 1506 can be removed to form the simplified combined census 1510.

The census technique may include inferring a correlation between a first account and a second account by identifying rows in the simplified combined census 1510 that show a reduced count (e.g., because a reduced count indicates an Account # for which a value has changed). In this example Account #123-002 has been changed four times by the updates represented in the updated general ledger 1504. Thus, a portion of a proposed rule can be developed:

If Account #="123-002" then . . .

The census technique can then include identifying the particular changes involving Original Account #123-002 that were made, as represented by the dataset 1512 of FIG. 15*d*. In this example, the Original Account #123-002 is changed to New Account #123-003 100% of the time. Thus, the census technique may suggest the proposed rule:

If Account #="123-002" then create a change record to make Account #="123-003"

Figure 15E:
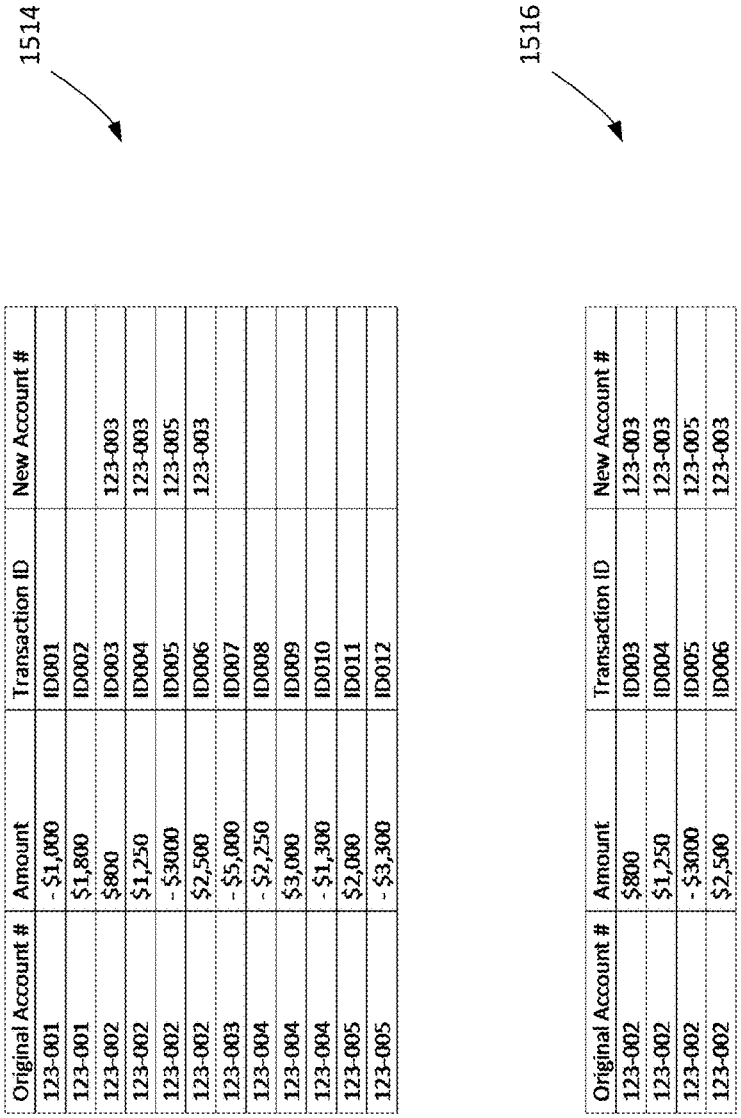

In some implementations, the Original Account # is not always changed to the same New Account # in every update. The census technique may attempt to identify a pattern related to the changes. In some implementations, the census technique may operate in a manner similar to a functional dependency technique, except that the technique is applied to a significantly reduced set of records (e.g., as compared to the number of records that would typically be involved in a true functional dependency technique). In some implementations, the census technique can attempt multiple heuristics until it identifies a combination of heuristics that yield a 100% correlation. For example, FIG. 15e shows an updated general ledger 1514 and a corresponding dataset 1516 that represents the updated entries. The updated general ledger 1514 and the corresponding dataset 1516 shows that Original Account #123-002 is updated 100% of the time, but Original Account #123-002 is not always changed to the same New Account #. Rather, Original Account #123-002 is changed to New Account #123-003 in three instances and New Account #123-005 in one instance. However, by considering an additional heuristic (e.g., the amount of the transaction), a 100% correlation can be inferred.

Figure 15F:
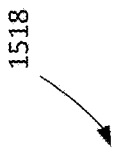
Figure 15F:

FIG. 15f shows a first dataset 1518 and a second dataset 1520 that each identifies unique combinations of heuristics. The first dataset 1518 uses a transaction amount of greater than $1,000 as one of the heuristics. However, using this heuristic only yields a 67% correlation between Original Account #123-002 and New Account #123-003. In other words, two of the instances in which the Account # was changed from 123-002 to 123-003 involved a transaction amount of greater than $1,000, and one of the instances in which the Account # was changed from 123-002 to 123-003 did not involve a transaction amount of greater than $1,000. However, the second dataset 1520 uses a transaction amount of greater than $0 as one of the heuristics. Using this heuristic yields a 100% correlation between Original Account #123-002 and New Account #123-003. In other words, every instance in which the Account # was changed from 123-002 to 123-003 involved a transaction amount of greater than $0. Thus, the census technique (e.g., with the help of some functional dependency principles) may suggest the proposed rule:

If Account #="123-002" and Amount >$0 then create a change record to make Account #="123-003"

The census technique may also suggest the proposed rule:
If Account #="123-002" and Amount <=$0 then create a change record to make Account #="123-005"

However, because there is only one instance of the Account # being updated from 123-002 to 123-005 under these condition, such a proposed rule may or may not be accepted depending on the particular implementation.

Figure 16:
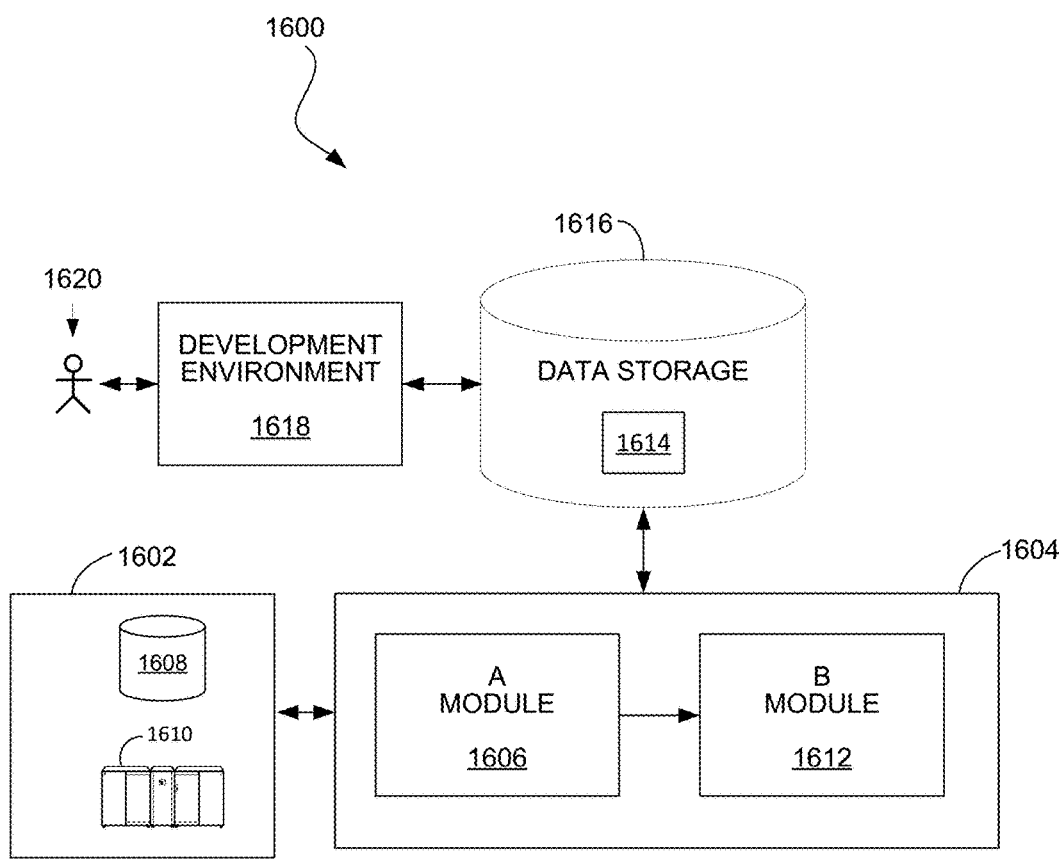
FIG. 16 is a block diagram of a system for generating a record correction rule.

FIG. 16 shows an exemplary data processing system 1600 in which the rules generation techniques can be used. For example, the data processing system 1600 could be used in connection with the analysis engine 604 or rules generation engine 606 shown in FIG. 6. The system 1600 includes a data source 1602 that may include one or more sources of data such as storage devices or connections to online data streams, each of which may store or provide data in any of a variety of formats (e.g., database tables, spreadsheet files, flat text files, or a native format used by a mainframe). For example, the data streams can provide the transactions 110-132 shown in FIG. 1, and the storage devices can store the general ledger 108 shown in FIG. 1. An execution environment 1604 includes a pre-processing module 1606 and an execution module 1612. The execution environment 1604 may be hosted, for example, on one or more general-purpose computers under the control of a suitable operating system, such as a version of the UNIX operating system. For example, the execution environment 1604 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The pre-processing module 1606 reads data from the data source 1602. Storage devices providing the data source 1602 may be local to the execution environment 1604, for example, being stored on a storage medium connected to a computer hosting the execution environment 1604 (e.g., hard drive 1608), or may be remote to the execution environment 1604, for example, being hosted on a remote system (e.g., mainframe 1610) in communication with a computer hosting the execution environment 1604, over a remote connection (e.g., provided by a cloud computing infrastructure).

The execution module 1612 uses data prepared by the pre-processing module 1606. The output data may be 1614 stored back in the data source 1602 or in a data storage system 1616 accessible to the execution environment 1604, or otherwise used. The data storage system 1616 is also accessible to a development environment 1618 in which a developer 1620 is able to configure the analysis engine 604 and the rules generation engine 606 shown in FIG. 6. The development environment 1618 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,566,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 1606 can receive data from a variety of types of systems that may embody the data source 1602, including different forms of database systems. The data may be organized as records having values for respective fields (also called "attributes" or "columns"), including possibly null values. When first reading data from a data source, the pre-processing module 1606 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

The rules generation approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer-implemented method including:
receiving data representing updates to transaction entries in a ledger of an accounting system, each transaction entry identifying an account that corresponds to the transaction entry, at least some of the updates a) each changing the identified account from a first account to a second account and b) having been submitted by multiple users of the accounting system;
analyzing the updates to detect a correlation that may exist between the first account and the second account, including analyzing at least one characteristic, other than an identity of an account, of at least some of the updated transaction entries;
generating a rule defining a modification of transaction entries, wherein the rule, if applied to transaction entries received by the accounting system, would modify transaction entries identifying the first account to identify the second account, and wherein the rule includes evaluating a threshold applied to a value of the at least one characteristic of at least some of the updated transaction entries;
providing the rule to a user interface for approval by another user of the multiple users; and
in response to approval made at the user interface, storing the rule in a storage system such that the stored rule can be accessed and executed by a computer program executing on one or more computer systems, the execution of the rule causing the modification of the transaction entries defined by the rule.

2. The method of claim 1, including providing the generated rule for approval to an entity authorized to modify transaction entries received by the accounting system.

3. The method of claim 2, in which the entity authorized to modify transaction entries received by the accounting system includes a manager of the multiple users of the accounting system.

4. The method of claim 1, wherein the analysis of the updates includes a determination of a percentage of the transaction entries that identified the first account that were changed to identify the second account.

5. The method of claim 1, including providing, to the entity, a companion report that includes information related to the generated rule.

6. The method of claim 5, wherein the companion report describes one or more of i) a percentage of times the account identification was updated by the multiple users, ii) an estimate of labor cost of the manual updates, iii) example changes to the ledger if the rule were approved, and iv) materiality of the changes to the ledger over a time period.

7. The method of claim 1, including updating, in a test environment, a first instance of the ledger based on the rule, in parallel with a second instance of the ledger that is not updated based on the rule.

8. The method of claim 1 in which the correlation is identified based on a census technique.

9. The method of claim 1 in which the correlation is identified based on a functional dependency technique.

10. The method of claim 1, including generating data representing one or more characteristics used to identify the correlation that may exist between the first account and the second account; and providing the data representing the one or more characteristics to the user interface.

11. The method of claim 1, wherein the at least one characteristic of at least some of the updated transaction entries includes values of fields of the at least some updated transaction entries, and wherein the rule includes evaluating a threshold applied to the values of the fields.

12. A system including:
a recordkeeping system configured to receive, from multiple users, manual updates to values of records stored by the recordkeeping system;
an analysis engine configured to identify one or more patterns among the updates received from the multiple users, including analyzing one or more characteristics of the updates to identify a correlation that may exist between a first account and a second account, including analyzing at least one characteristic, other than an identity of an account, of at least some of the updated records, and generate data representing the one or more characteristics used to identify the correlation that may exist between the first account and the second account;

a rules generation engine configured to generate one or more rules based on the one or more patterns identified by the analysis engine, wherein at least one of the rules includes evaluating a threshold applied to a value of the at least one characteristic of at least some of the updated records;

a rules interface configured to provide, to a recordkeeping manager, the one or more rules generated by the rules generation engine and the data representing the one or more characteristics, and receive user input representing approval of at least one of the rules; and a storage system configured to, in response to the approval, store the rule such that the stored rule can be accessed and executed by a computer program executing on one or more computer systems, the execution of the rule causing the modification of the transaction entries defined by the rule.

13. The system of claim 12 in which the rules interface is configured to receive, from the recordkeeping manager, approval for one or more of the rules.

14. The system of claim 12 in which the recordkeeping system is an accounting system.

15. The system of claim 14 in which the records are stored in a general ledger of the accounting system.

16. The system of claim 14 in which the updates to values of records include changing an account identified in at least some of the records from a first account to a second account.

17. The system of claim 12 in which the one or more of the patterns includes a correlation between the first account and the second account.

18. The system of claim 12 in which
the recordkeeping system is a securities trading system operated by a securities brokerage, and
the records include securities trade instructions.

19. The system of claim 18 in which the updates to values of the records include changing an error in at least some of the securities trade instructions.

20. The system of claim 19 in which the updates to values of the records are received from a system of a middle office of the securities brokerage.

21. The system of claim 12 in which the recordkeeping system is operated by a freight forwarder, and the records include shipment instructions.

22. The system of claim 21 in which the updates to values of records include changing an error in at least some of the shipment instructions.

23. The system of claim 12 in which
the recordkeeping system is operated by an entity that manages pharmaceutical benefits, and
the records include requests to approve a pharmaceutical purchase by the entity that manages pharmaceutical benefits, where a request is processed by the entity to determine one or more of i) whether a customer associated with the request is eligible for a particular health coverage, ii) whether the pharmaceutical is on a formulary for a health plan associated with the customer, iii) whether a generic pharmaceutical can be substituted for the pharmaceutical, and iv) a co-pay amount to be collected as part of the purchase.

24. The system of claim 23 in which the updates to values of the records include manual corrections to at least some of the requests which could not be approved automatically.

25. The system of claim 12 in which the patterns are identified based on a census technique.

26. The system of claim 12 in which the patterns are identified based on a functional dependency technique.

27. A non-transitory computer readable storage device storing a computer program product including executable code that, when executed, would cause a computer system to carry out operations including:

analyzing the updates to detect a correlation that may exist between the first account and the second account, including analyzing at least one characteristic, other than an identity of an account, of at least some of the updated transaction entries;

generating a rule defining a modification of transaction entries, wherein the rule, if applied to transaction entries received by the accounting system, would modify transaction entries identifying the first account to identify the second account, and wherein the rule includes evaluating a threshold applied to a value of the at least one characteristic of at least some of the updated transaction entries;

providing the rule to a user interface for approval by another user of the multiple users; and in response to approval made at the user interface, storing the rule in a storage system such that the stored rule can be accessed and executed by a computer program executing on one or more computer systems, the execution of the rule causing the modification of the transaction entries defined by the rule.

\* \* \* \* \*